United States Patent
Dacus et al.

(10) Patent No.: US 10,432,996 B2
(45) Date of Patent: Oct. 1, 2019

(54) MATCHING DATA OBJECTS TO VIDEO CONTENT

(71) Applicant: KUBE-iT Inc., Los Angeles, CA (US)

(72) Inventors: Taylor Dacus, Los Angeles, CA (US);
Barry Dacus, Los Angeles, CA (US);
Jon Niedfeldt, Los Angeles, CA (US);
Emil Lau, Los Angeles, CA (US)

( * ) Notice: Subject to any disclaimer, the term of this patent is extended or adjusted under 35 U.S.C. 154(b) by 0 days.

(21) Appl. No.: 15/286,440

(22) Filed: Oct. 5, 2016

(65) Prior Publication Data

US 2017/0026672 A1 Jan. 26, 2017

Related U.S. Application Data

(63) Continuation of application No. PCT/US2015/059558, filed on Nov. 6, 2015.
(Continued)

(51) Int. Cl.
*H04N 21/41* (2011.01)
*H04N 21/81* (2011.01)
(Continued)

(52) U.S. Cl.
CPC ....... *H04N 21/4126* (2013.01); *G06F 16/738* (2019.01); *G06F 16/7867* (2019.01);
(Continued)

(58) Field of Classification Search
None
See application file for complete search history.

(56) References Cited

U.S. PATENT DOCUMENTS

| 7,949,565 B1 | 5/2011 | Eldering et al. |
| 8,689,255 B1 * | 4/2014 | Gregov ............. H04N 21/4722 725/38 |

(Continued)

FOREIGN PATENT DOCUMENTS

| CN | 101300594 A | 11/2008 |
| JP | 09-034821 | 2/1997 |

(Continued)

OTHER PUBLICATIONS

English translation of Office Action for Japanese Application No. 2014-510376 dated Apr. 5, 2016.
(Continued)

*Primary Examiner* — Fernando Alcon
(74) *Attorney, Agent, or Firm* — Cislo & Thomas, LLP

(57) ABSTRACT

A distributed application is executed by a client device, sampling output by a player device that is playing audio-video content, and obtains information (e.g., advertising) relating to an object that is imaged or referenced in a portion of the playing content. The client device outputs the information on the client device while the content is playing on the player device, and optionally receives user input responsive to the information. The user of the client device receives the advertising or other information without any interruption of the content playing on the player device. Associating and providing user interface objects (information "cards") in connection with limited portions of video content enables more user-friendly, less distracting advertising in connection with video content.

19 Claims, 25 Drawing Sheets

Related U.S. Application Data

(60) Provisional application No. 62/237,345, filed on Oct. 5, 2015, provisional application No. 62/077,043, filed on Nov. 7, 2014.

(51) Int. Cl.

| | | |
|---|---|---|
| *H04N 21/475* | (2011.01) | |
| *H04N 21/84* | (2011.01) | |
| *H04N 21/45* | (2011.01) | |
| *H04N 21/4725* | (2011.01) | |
| *H04N 21/234* | (2011.01) | |
| *H04N 21/44* | (2011.01) | |
| *H04N 21/658* | (2011.01) | |
| *G06Q 30/02* | (2012.01) | |
| *G07C 13/00* | (2006.01) | |
| *G06F 16/738* | (2019.01) | |
| *G06F 16/78* | (2019.01) | |
| *H04L 29/08* | (2006.01) | |
| *H04W 88/02* | (2009.01) | |

(52) U.S. Cl.
CPC ......... *G06Q 30/0233* (2013.01); *G07C 13/00* (2013.01); *H04N 21/23418* (2013.01); *H04N 21/44008* (2013.01); *H04N 21/4524* (2013.01); *H04N 21/4532* (2013.01); *H04N 21/4725* (2013.01); *H04N 21/4758* (2013.01); *H04N 21/6581* (2013.01); *H04N 21/812* (2013.01); *H04N 21/84* (2013.01); *H04L 67/10* (2013.01); *H04W 88/02* (2013.01)

(56) References Cited

U.S. PATENT DOCUMENTS

| | | | | |
|---|---|---|---|---|
| 8,898,713 | B1 * | 11/2014 | Price | G06F 17/30412 725/21 |
| 9,357,242 | B2 * | 5/2016 | Sinha | G06F 17/3082 |
| 2002/0128908 | A1 | 9/2002 | Levin et al. | |
| 2003/0093790 | A1 * | 5/2003 | Logan | G06F 17/30265 725/38 |
| 2004/0133468 | A1 | 7/2004 | Varghese | |
| 2007/0055566 | A1 | 3/2007 | Gaughan et al. | |
| 2008/0195457 | A1 | 8/2008 | Sherman et al. | |
| 2008/0196060 | A1 * | 8/2008 | Varghese | H04N 7/16 725/34 |
| 2009/0017805 | A1 | 1/2009 | Sarukkai et al. | |
| 2009/0037949 | A1 | 2/2009 | Birch | |
| 2009/0158320 | A1 | 6/2009 | Riedl et al. | |
| 2010/0114717 | A1 | 5/2010 | Lebeau et al. | |
| 2010/0115060 | A1 | 5/2010 | Julia et al. | |
| 2010/0162322 | A1 | 6/2010 | Roberts et al. | |
| 2010/0250348 | A1 | 9/2010 | Dunbar | |
| 2011/0055012 | A1 | 3/2011 | Christianson et al. | |
| 2011/0246298 | A1 | 10/2011 | Williams et al. | |
| 2011/0258049 | A1 | 10/2011 | Ramer et al. | |
| 2011/0295719 | A1 | 12/2011 | Chen et al. | |
| 2012/0011282 | A1 | 1/2012 | Williams et al. | |
| 2012/0022914 | A1 | 1/2012 | Thomas et al. | |
| 2013/0061261 | A1 | 3/2013 | Pakula | |
| 2014/0173643 | A1 | 6/2014 | Bhatia et al. | |

FOREIGN PATENT DOCUMENTS

| | | | |
|---|---|---|---|
| JP | 2002-202988 | 7/2002 | |
| WO | 2012154565 | 11/2012 | |
| WO | WO-2015034818 A1 * | 3/2015 | ......... H04N 21/4756 |

OTHER PUBLICATIONS

Partial English translation of Japanese Patent Application No. 2002-202988 dated Jul. 19, 2002.
Partial English translation of Japanese Patent Application No. 09-034821 dated Feb. 7, 1997.
PCT; International Preliminary Report on Patentability dated Nov. 12, 2013 in Application No. PCT/US2012/036537.
EPO; European Search Report dated Sep. 25, 2014 in Application No. EP 12782562.8.
Notification of Transmittal of the International Search Report and the Written Opinion of the International Searching Authority, or the Declaration dated Nov. 30, 2012.
EPO Communication Pursuant to Article 94(3) EPC dated Jul. 5, 2016 in Application No. EP12782562.8.
Russian Search Report and Written Opinion dated Feb. 15, 2016 for PCT/US2015/059558.
International Preliminary Report on Patentability dated May 9, 2017 for PCT/US2015/059558.
Chinese Office Action dated Sep. 18, 2016 from Chinese Application No. 201280033628.0.
English Translation for Chinese Office Action dated Sep. 18, 2016 from Chinese Application No. 201280033628.0.

* cited by examiner

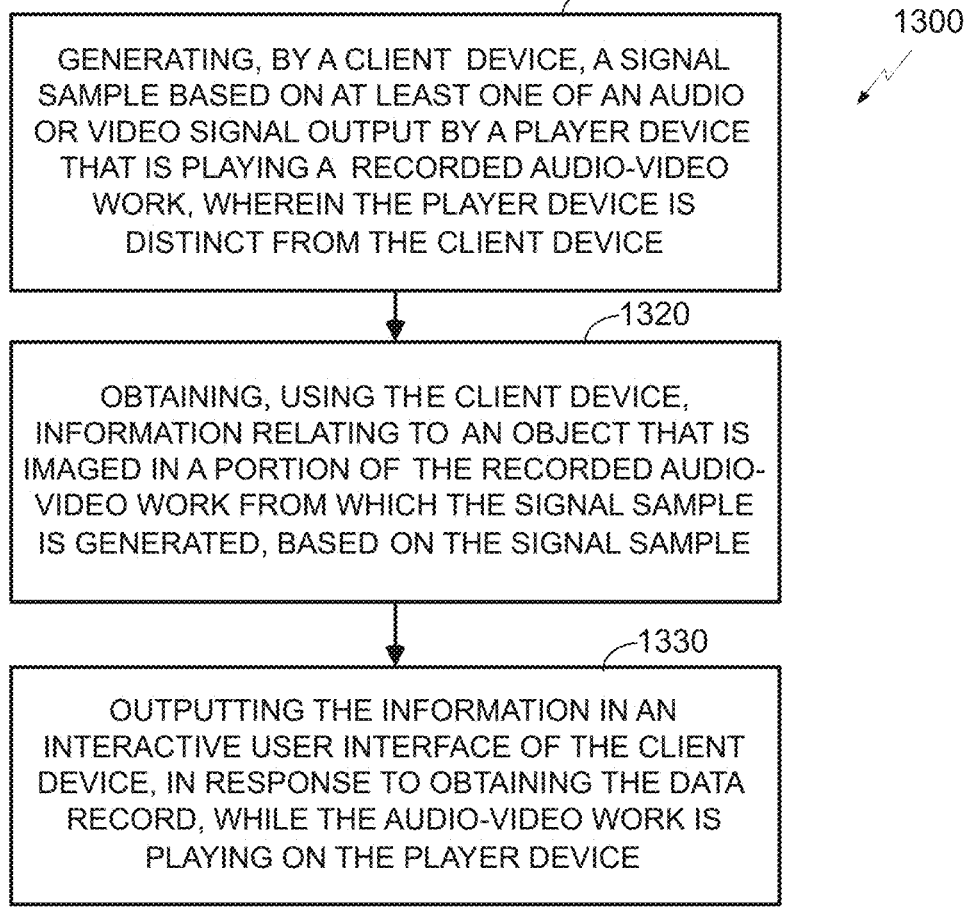
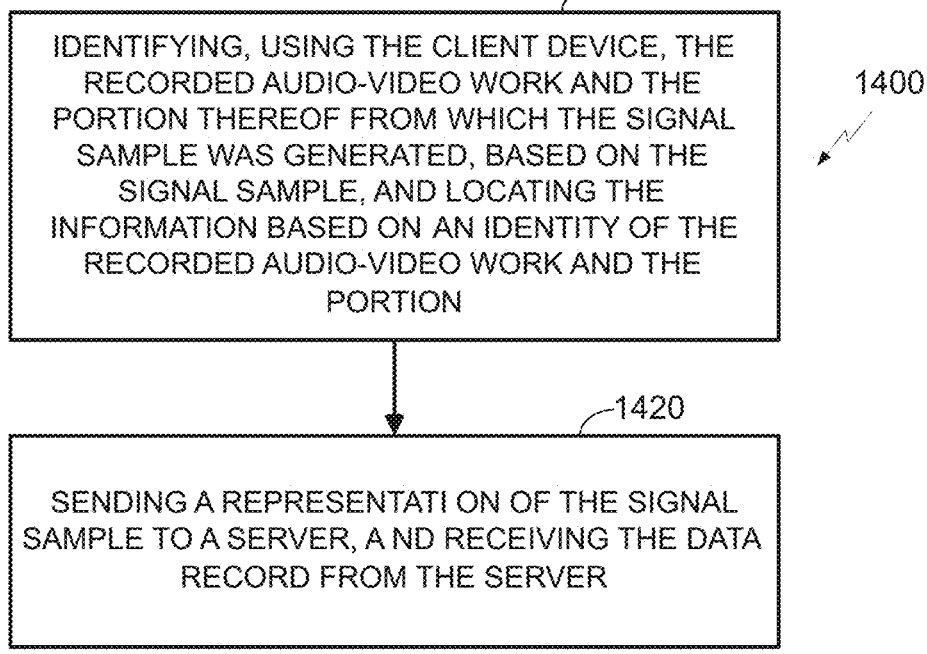

FIG. 22
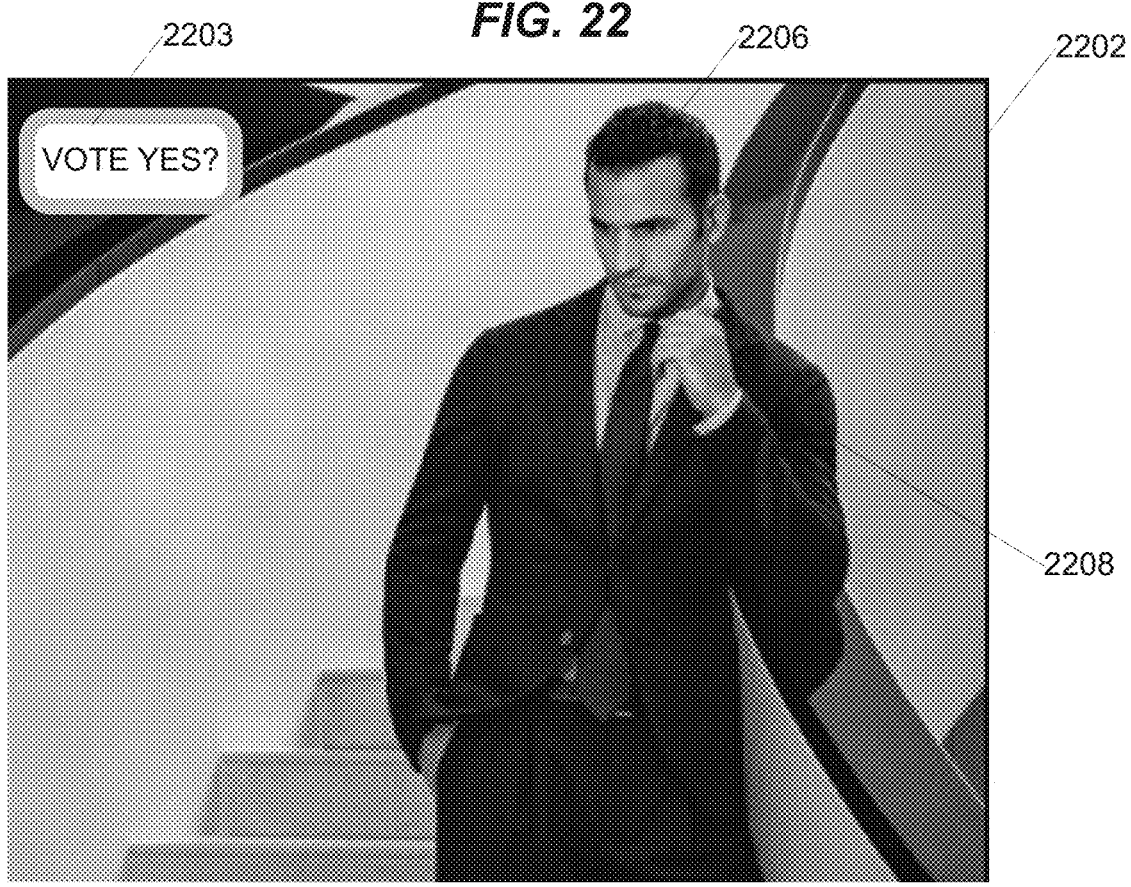
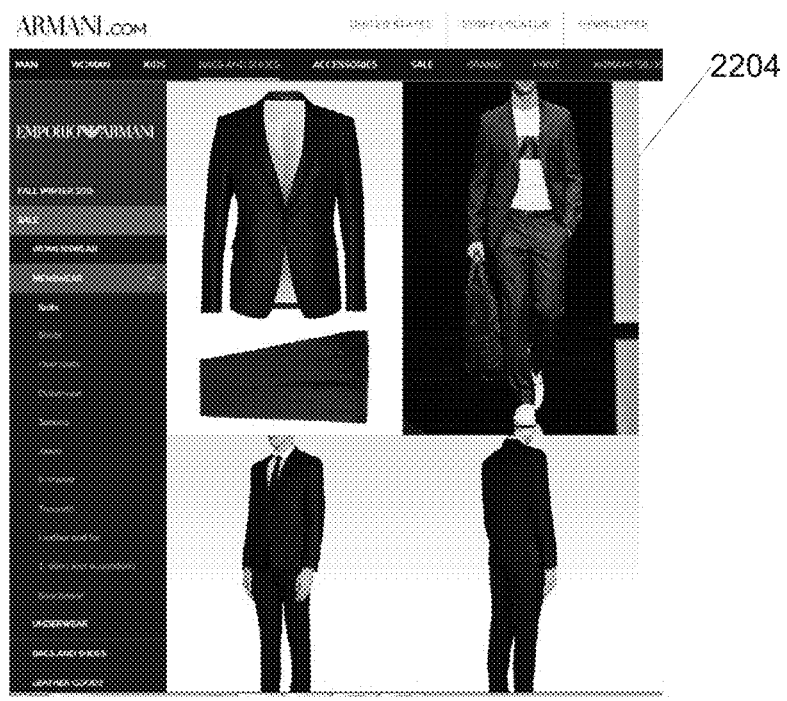

MATCHING DATA OBJECTS TO VIDEO CONTENT

CROSS-REFERENCE TO RELATED APPLICATIONS

This application is a continuation of International Application PCT/US2015/059558 filed Nov. 6, 2015, which claims priority pursuant to 35 U.S.C. § 119(e) to U.S. provisional application Ser. No. 62/077,043 filed Nov. 7, 2014. This application further claims priority pursuant to 35 U.S.C. § 119(e) to U.S. provisional application Ser. No. 62/237,345 filed Oct. 5, 2015. All of the foregoing applications are incorporated herein by reference, in their entireties.

FIELD

The present disclosure relates to applications for signal processing and the operation of matching data objects that provide information of interest to corresponding video content, and to applications for signal processing and the operation of visual user interfaces to provide information of interest and a user interface in an interactive user interface device that organizes and shares the information based on user input.

BACKGROUND

People spend an increasing amount of time consuming various types of recorded or computer-generated content during their leisure time, for example video from both professional production studios and amateur sources through traditional broadcast or cable sources, or over computer networks; various types of video games or similar interactive content, content posted on online social media sites, or just content from the World Wide Web generally. A significant fraction of this content or the systems used to deliver it are funded by advertising. Such advertising includes traditional broadcast ads, streaming video or audio ads, web page banner or pop-up ads, product placement within content, interactive icons or regions in streaming video, and other forms. Often, advertising interferes with the user experience in various ways, such that it is viewed as a negative.

The content of the advertisements may be used or referenced in portions of video content. It therefore would be desirable for the content of the advertisements to be presented during the corresponding portion of the video content. For example, advertisements may be presented on an auxiliary device or different area of the screen so as to not intrude on the user experience. However, it is undesirable for the advertisement to be separated from the corresponding portion of video content as this may detract from positive user interest in the advertisement. Furthermore, an amount of time and effort for a single entity to match advertisements to a topically relevant portion of the video content may not be economically feasible, in many circumstances. As used herein, "advertisement" includes either paid or unpaid commercial messages, and non-commercial messages, in either case of a sort that are broadcast or multicast to multiple users based on some targeting criteria. Targeting criteria may include, for example, criteria from demographic profiles or users' interest profiles inferred from available consumption data.

Another aspect of content consumption and advertising is the tendency for content to be consumed by a user in many different venues and using many different delivery platforms. For example, a user may view content on a television; or using a mobile phone, a notepad device, a laptop or desktop computer; or may view content in a cinema or on an electronic billboard. Some delivery platforms by be devices owned or controlled by the person viewing the content, while other platforms may be under the control of other people. The diversification and fragmentation of content delivery channels makes it correspondingly hard to integrate delivery of advertising or other information across multiple platforms or channels.

It would be desirable, therefore, to develop new hardware, network systems, user interfaces, and other new technologies for applications of signal processing to match the advertisements to video content (e.g., short video clips) and/or to corresponding proper portions of video content by requesting assistance from entities other than the video producer. It would be further desirable to develop new hardware, network systems, user interfaces, and other new technologies for applications of signal processing and the operation of visual user interfaces to provide information of interest and a user interface in an interactive user interface device that organizes and shares the information based on user input, that overcomes the limitations of the prior art, and enhances the ease, convenience and utility of electronic communication.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

Aspects of the disclosure include a method that includes generating, by a client device, a signal sample based on at least one of an audio or video signal output by a player device that is playing a recorded audio work, recorded video work, or recorded audio-video work, wherein the player device is distinct from the client device. The client device may be, for example, a mobile smart phone with an interactive touch screen, microphone, camera, transceiver for a wireless phone network, processor, and memory, among other things. The player device may be any device or machine, computerized or not, that produces audio or video output from a digital or analog recording, including output from streaming audio or video content. The sample may be generated by recording audio output from the player device using the microphone of the client device, by imaging a screen of the player device, or by some other method.

The method may include obtaining, using the client device, information relating to an object that is imaged in a portion of the recorded audio work, recorded video work, or recorded audio-video work from which the signal sample is generated, based on the signal sample. The obtaining may include, for example, transmitting the signal or a representation of the signal to a database application operating on a server, obtaining the information, and receiving the data record from the server. In the alternative, or in addition, the obtaining the information may include identifying, using the client device and/or the server, the recorded audio work, recorded video work, or recorded audio-video work and the portion thereof from which the signal sample was generated, based on the signal sample, and locating the information based on an identity of the recorded audio work, recorded video work, or recorded audio-video work and the portion. The object may be imaged in a visible portion of output from the recorded video or audio-video work. In the alternative, or in addition, the object, or metadata about the object, may be imaged in a non-visible portion of the recorded audio work, recorded video work, or recorded audio-video work. The audio or video work may be recorded in a non-transitory medium, for example, an electronic memory storage device, a magnetic computer-readable medium, or an optical computer-readable medium.

The method may further include outputting the information in an interactive user interface of the client device, in response to obtaining the data record, while the audio or video work is playing on the player device. Outputting the information may include displaying an interactive card-like data object containing the information on a display screen of the client device. The card-like data object, sometimes referred to herein or in the accompanying materials as a "KUBE-iT"™ card, or "card" for short, may comprise a user interface object that includes information about the imaged object, links to further information about the object, and command objects or links to a command interface for user-controlled disposition of the KUBE-iT™ card. As used herein, a "user interface object" may be, or may include, a discrete data set configured for display and user interaction in a user interface as a user-manipulable discrete object, for example, as a "card" or "window." While a card is illustrated and described as an example of a user interface, it should be appreciated that the inventive aspects need not be limited to objects resembling two-dimensional cards.

Disposition may include, for example, saving the card in a default category of a user database, saving the card in a user-specified category of a user database, sharing the card with a designated user, adding a card to a wish list, expressing interest in a card, expressing disinterest in a card, discarding a card, requesting further information about an object described by a card, a combination of the foregoing or other disposition. Data regarding cards received by the client device and any related dispositions may be stored in a memory related to a user account, for example, in a cloud-based storage collection of records associated with a particular user name.

Absent receipt of a user command directing a specific disposition of a card, the method may include removing the interactive card-like data object containing the information from the display screen upon the earlier of: expiration of a designated period of time since initiating the displaying, or receiving later information relating to a different object that is referred to or imaged in a subsequent portion of the recorded audio work, recorded video work, or recorded audio-video work.

The method may further include saving, in a computer memory, an identifier for the information in association with a user identity of a user of the client device. For example, the method may include saving an indication of affirmative user interest in association with the information, in response to receiving user input via the interactive card-like data object. The saving may include, for example, associating the identifier with a category indicator indicated by the user. In another aspect, the saving may include sending the information and category location to the computer memory located in a network location in association with an account identifier enabling access to the information and category using other client devices.

In another aspect, the method may include tracking indications of affirmative user interest in additional interactive card-like data objects for different objects, and crediting a user account, for example with reward points, based on at least one of a number or a frequency that the user provides the indications of affirmative user interest.

The method may further include displaying a user interface screen for purchase of the object by the user, in response to user selection of an interface control object for initiating a purchase transaction. The method may include displaying a list of eligible information categories on the display screen configured for enabling user selection of the category indicator. The method may include providing a user interface enabling the user to designate at least one of the information categories for publication to a designated social group as a category of special interest (e.g., a wish list) to the user. The method may include, in response to user selection of a category on the list, obtaining and displaying a collection of card like data objects each previously categorized under the category by the user. The method may include, in response to user selection of a category on the list, obtaining and displaying a collection of card like data objects each previously categorized under the category by other users who have designated the category as shared with the user.

In another aspect, KUBE-iT™ card data may be provided based on geo-location or other location-based trigger such as, for example, receiving a wireless signal from a signaling device placed in a retail location. Accordingly, the method may include obtaining, using the client device, object information related to an object selected based on a current location of the client device, and outputting the information at least in part by displaying another interactive card-like data object containing the object information on the display screen. This provides the convenience of the KUBE-iT™ card information management in contexts other than listening or viewing recorded audio or video content.

The client device comprising an interactive touch screen, microphone, camera, transceiver for a wireless phone network, and memory coupled to a processor. The microphone and/or camera may capture the audio or visible signal samples and transmit to the processor. The processor may perform a digital signal analysis of the samples and send information from the sample or the samples to an identification server. The touch screen may receive user touch input and send electronic signals to the processor in response to the touch input, and display the interactive KUBE-iT™ cards to the user. The memory may hold encoded instructions, that when executed by the processor, cause the client device to perform operations of the method as described. The memory may comprise a non-transitory computer-readable medium.

In another, complementary aspect, a server-side method may include receiving, via a user interface of a server enabling user input, information related to an object that is referred to or imaged in a portion of a recorded audio work, recorded video work, or recorded audio-video work or that is related to an identified geographic location. For example, the server may transmit a user interface object to a terminal, in response to a receiving a request direct to a Uniform Resource Locator (URL) of the server. The user interface object may include code that executes on the terminal in response to user selection of a user interface element of a web page that is accessed on the terminal via a web browser. The code may include one or more modules for describing or identifying the object that is referred to or imaged in a portion of a recorded audio work, recorded video work, or recorded audio-video work or that is related to an identified geographic location in response to user input to the terminal, and relating the object to a portion (e.g., time line segment) of a particular audio or video work or to a geographic location.

The server-side method may further include recording, in a data structure accessible over a computer network, the information in association with an identifier for the portion of the recorded audio work, recorded video work, or recorded audio-video work or for the geographic location. For example, the server may transmit the information and an identifier for the audio or video work or location received from the terminal to a database server, with instructions for saving as related records in a database. The recording operation may further include associating the information with a category indicator based on a signal received from a client device, which is interpreted as indicating user selection of a category to which the card should be assigned.

The method may further include receiving, via the user interface, further information for controlling generation of an interactive card-like data object containing the information for display on a display screen. The information may include, for example, format information, image data including an image of the object, text data describing the object, and a set of user interface controls enabling a user to control disposition of the object.

The server-side method may include tracking requests for the information from client devices that identify the portion of the recorded audio work, recorded video work, or recorded audio-video work or the geographic location in connection with the requests. The tracking may include, for example, saving, in a computer memory, user identities each associated with ones of the requests. The method may further include tracking additional information requests from the client devices that indicate a user interest in at least one of purchasing the object or obtaining further information about the object. The method may further include comprising tracking distribution of information based on one or more category indicators designated by end consumers of the information, or tracking distribution of information based on one or more social groups designated by end consumers of the information. The method may include crediting user accounts, for example with reward points, based on at least one of a number or a frequency that of the requests per user. The method may include determining an advertising value for distribution of the information based on a quantity of at least one of the requests or the additional information requests within a define time period.

A server apparatus may include a processor, a memory coupled to the processor, and a network interface coupled to the processor, wherein the memory holds instructions that when executed by the processor, cause the apparatus perform the operations described above, and elsewhere herein. The memory may be, or may include, a non-transitory computer-readable medium.

In some aspects, a method by an application server for matching information to video content for creation of a relatively large volume of information-to-video content matches includes providing, by an application processor and via a network access device, a list of videos to be reviewed for tagging with a tag that identifies a limited portion of the video content of a corresponding video listed in the list of videos. The method also includes receiving, from each of a plurality of devices each associated with a corresponding user account and via the network access device, a message including at least one vote indicating that the tag corresponds to a Graphical User Interface (GUI) enabled data object, or other user interface object, that includes information topically relevant to a subject of video content of one video of the list of videos. A GUI enabled data object may sometimes be referred to herein as, or may be an aspect of, a "card" or "Kube-iT card," and more generally as a "user interface object." GUI enabled data objects may include, for example, HTML or XML objects, or other information objects configured for display by a GUI of a computer. The method also includes validating, by the application processor, that the tag corresponds to the GUI enabled data object based at least in part on a number of received votes compared to a threshold number of votes.

In some aspects, a method by an application server for matching information to video content for creation of a relatively large volume of information-to-video content matches includes providing, by an application processor, a plurality of Graphical User Interface (GUI) objects each including information topically relevant to a subject of video content of a video. The method also includes receiving, from one of a plurality of devices each associated with a corresponding user account and via a network access device, data indicating that a one of the plurality of GUI enabled data objects corresponds to a limited portion of video content of one of a plurality of videos. The method also includes associating, by the application processor, a GUI enabled data object with the limited content of the video content. The method also includes associating a tag with the GUI enabled data object, the tag identifying the limited content and the GUI enabled data object.

In some aspects, a method by a client device for matching information to video content for creation of a relatively large volume of information-to-video content matches includes transmitting, by a network access device and to an application server, identification information corresponding to a user account. The method also includes outputting, via an output device, a video including the video content that includes a tag identifying a limited portion of video content. The method also includes receiving, from a user and via an input device, data indicating that the tag corresponds to a Graphical User Interface (GUI) object that includes information topically relevant to a subject of the video content. The method also includes transmitting, by the network access device and to an application server, the data indicating that the tag corresponds to the GUI enabled data object.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 13 is a flow chart illustrating aspects of a method by a client device for synchronizing and display of an interactive card-like data object on a the client device to external events detected.

FIGS. 14-17 are flow charts illustrating additional aspects of the method of claim 13.

FIG. 22 are images showing a card regarding a subject and a portion of video content including the subject of the card.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Portions of this disclosure refer to collecting metrics across one or more platforms. This is further disclosed in U.S. Patent Application No. 2013/0036007, titled Cross-Platform Collection of Advertising Metrics and filed on May 3, 2012, which is hereby incorporated by reference in its entirety. Portions of this disclosure further relate to International Application PCT/US2015/059558 filed Nov. 9, 2025, which claims priority to U.S. Provisional Patent Application No. 62/077,043, titled Interactive Electronic Data-Sharing Platform with Virtual Card Interface and filed on Nov. 7, 2014, which are hereby incorporated by reference in their entireties. The present technology provides a digital tool that allows consumers to select, save and share information from their favorite TV show or the internet, and then buy—with a single "click" or other simple user input action. The technology enables a new medium of advertising—which can mean fewer interruptions for the consumer—and especially reaches those who fast forward through interruptive commercials. The technology enhances user enjoyment of video content and enables shortening of the timeline to conversion.

Figure 1:
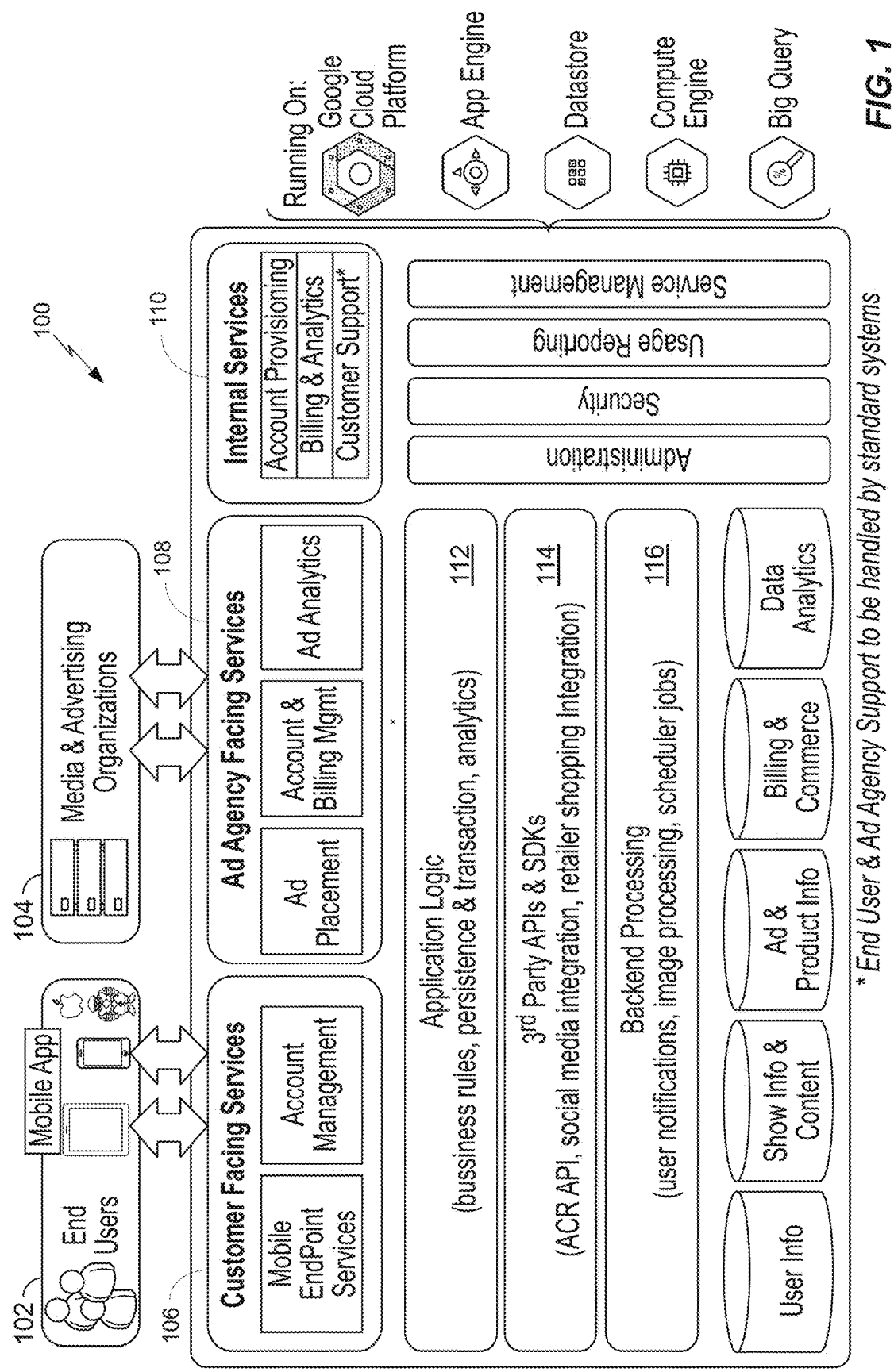
FIG. 1 is a block diagram illustrating overall aspects of a system for signal processing and the operation of visual user interfaces to provide information of interest and a user interface in an interactive user interface device that organizes and shares the information based on user input, including a KUBE-iT™ card information management system.

Referring to FIG. 1, in some embodiments a system architecture 100 may include three distinct application platforms, each with its own user interfaces and web services, that share state-machine services and work together to create an overall technical solution and user experience. These platforms may include an End User Application Platform 106 that enables end users 102 (e.g., customers) to use the card-based information web/mobile applications and access system 100 consumer services & products. The platforms may further include an Ad-Agency Application Platform 108 that enables advertisers and content providers 104 to access Ad Agency Services, including, for example, placing and managing advertisements in the form of electronic information cards synchronized to portions of video content, or making content available for ad placement. The platforms may include an Administrative & Internal Services Platform 110 that enables administrators and customer service personnel to provision and manage the overall system 100 infrastructure and services. Modules and resources underlie these platforms, for example a class of application logic objects 112 that define operational characteristics such as business rules, ad persistence, user transactions, and analytical services. The system may also be serviced by a class of 3$^{rd}$ party Application Program Interfaces (APIs) 114 for handling functions such as automatic content recognition (ACR), social media integration, and retailer integration. The system may also be supported by backend processing modules 116 handling actions such as user notifications, image processing, and job scheduling.

Figure 2:
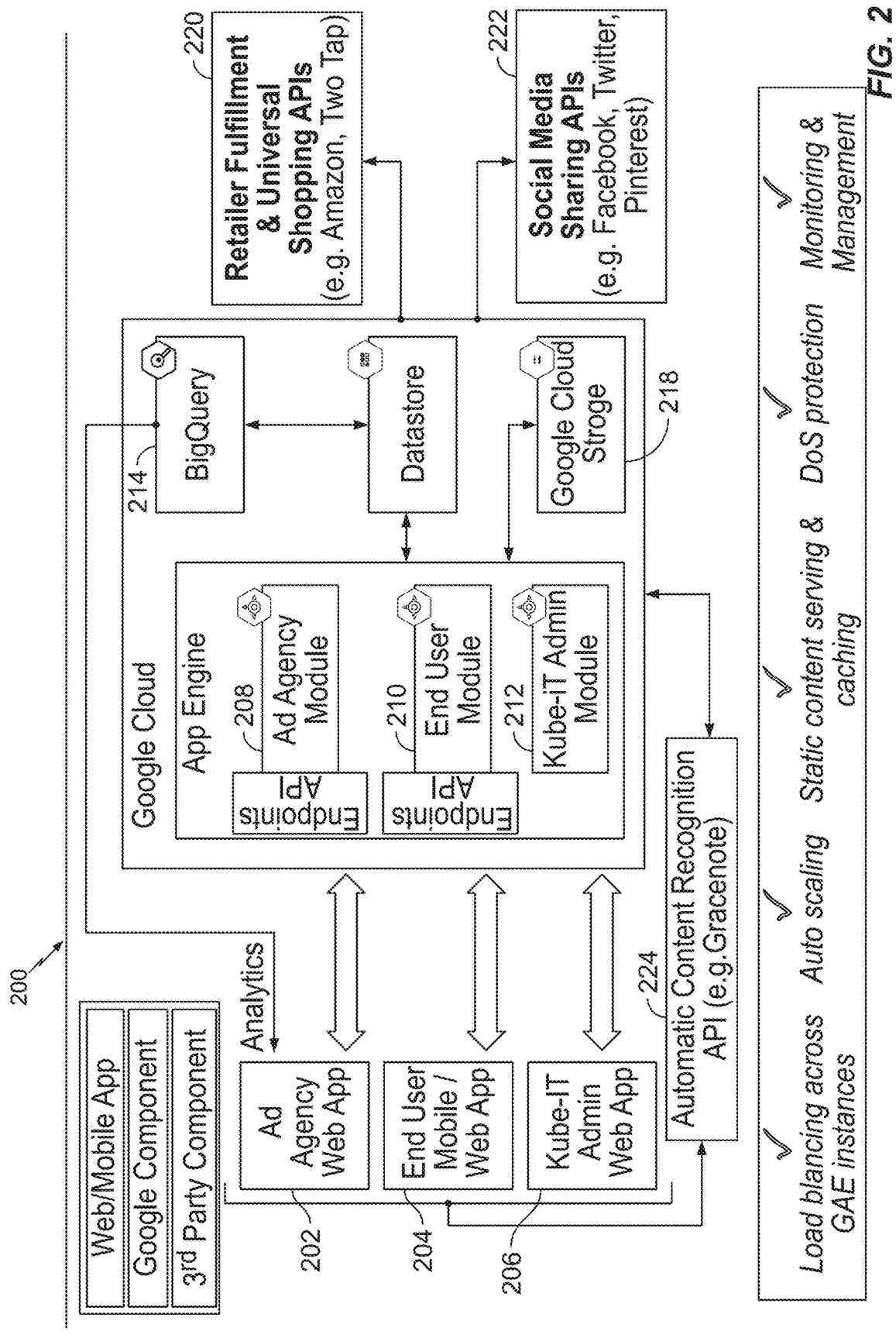
FIG. 2 is a block diagram showing a high-level technical architecture pertaining to a cloud-based implementation of a system as shown in FIG. 1.

Referring to FIG. 2, a high-level technical design 200 of an electronic information card solution using Cloud Platform components such as, for example, Google™ App Engine, BigQuery, Datastore and Cloud Storage. The proposed architecture will have strong elements of scalability, reliability and security across all components. The design 200 includes backend services that may be developed, deployed and managed using the Google™ App Engine or similar cloud resource. Using a cloud-based App Engine may enable development and launch of the system very quickly with minimal focus on infrastructure setup and management. For example, a cloud-based App Engine may be used to develop, deploy and manage the backend modules 208, 210, 212 that service requests from front-end mobile/web applications 202, 204, 206. The App Engine may be used to implement the user interface for browser clients, and expose APIs using Cloud Endpoints to mobile and desktop clients (for example consumers, ad agencies, internal admins). An cloud-based App Engine may function as the main system controller and manage all workflows for creating, serving and processing electronic information cards and products, and provide connectivity to other services (for example Maps API, Search API) and 3rd party components.

As seen in FIG. 2, the App Engine backend services may be divided into three different modules: End User Module 210, Ad Agency Module 208 and IT Admin Module 212. Modules are logical components that share state machine services and can communicate in a secure fashion. Each module may have one or more instances running based on configuration and workload. Splitting the overall application into modules provides certain advantages, for example:

- The different modules can be configured to use different runtimes and operate with different performance settings (e.g. the End User module can have higher-level performance settings than the Admin module).
- The modules can scale independently with appropriate growth in traffic. If there's a huge growth in consumers for any reason, only the End User Module will need to scale up.
- Breaking into modules reduces the overall code and configuration for a specific instance and thereby decreases the loading time when a new instance needs to be started.
- Each module can have its own version. So if a new Ad Agency feature needs to be added, that will not impact the End User Module.

The proposed system architecture 200 may also leverage the following App Engine components for delivering backend services. For example, backend services may include an Image Processing Service that provides dynamic image processing services such as thumbnail generation, resizing, and cropping for App Engine applications. This feature may help to optimize consumer mobile app 204 performance (size and speed) for image downloads of shows, networks and products. Backed services may further include a Memcache (memory cache) that provides a distributed in-memory data cache service to store and retrieve frequently accessed data. This feature may further optimize database lookups for frequently accessed information such as, for example, video content (titles) and products that were aired in the last ten days. Backend services may further include Google Task Queue & Scheduled Tasks, that provides mechanism to perform asynchronous tasks outside of a user request such as, for example, daily maintenance tasks that run at scheduled times, or push notifications to users when a new show and products are uploaded.

The proposed system architecture 200 may also incorporate persistent storage, for example, hosting a data model and application content using Datastore 216, which may include a fully-managed and scalable NoSQL database solution. Like a cloud-based App Engine, Datastore 216 may supports automatic scalability as traffic increases, automatic replication across multiple datacenters, high availability of reads and writes and continuous monitoring by a cloud service provider. Persistent storage needs for an effective solution are may include, for example:

- User Data: User login info & preferences, account settings, billing info;
- Ad Agency Data: Ad agency info, account settings, access permissions, billing info;
- Network & Show Data: Networks & Show/episode information;
- Product Data: Product info (including details, pictures, vendors, links, etc.);
- Performance Data: User lookups for KUBE-iT™ card-enabled shows and downloads/click-thru of Billing & Commerce: Billing transactions, invoices, payments from Ad Agencies The proposed system architecture 200 may also use Cloud Storage 218 for storing static content (for example, product pictures placed on electronic information cards) and server logs. Cloud Storage 218 should be implemented as a durable and highly available object storage service that supports redundant storage, flexible access and strong, configurable security through access controls. Storage requirements for the an effective technological solution may include:

- Network/shows/products media (pictures, videos);
- Audio fingerprinting of video or audio-only titles;
- Video fingerprinting of video titles;
- Server logs; and
- Analysis inputs/outputs and artifacts.

Where possible, the system 200 may use an existing cloud-based low-latency, edge-caching global network to deliver content faster to the customers. The proposed system architecture 200 may also offer a comprehensive analytics platform for Ad Agencies to analyze shows/product/user data and generate reports/dashboards on consumer interests and behavior. For example, a Google™ BigQuery module 214, or similar query service, may service a back end analytics platform. Such a module should be capable of analyzing massive datasets and providing real time insights to ad agencies on consumer behavior, for example tracking geographical distribution and demographic profiles of users downloading products for a particular video title. BigQuery 214 supports easy integration with App Engine for direct querying, bulk upload of data from Cloud Storage and streaming updates of up to 100,000 rows per second. The analytic platform may further include Automatic Content Recognition (ACR) APIs 224 that provide advanced audio or video fingerprinting technology to let smart phones and tablets identify movies and TV programs by simply "listening" to a few seconds of the program dialogue and soundtrack. ACR APIs also provide Web APIs for text based search of TV shows and episodes. Since many audio recognition and content validation APIs are already available, a system administrator may license a third party API for a usage-based fee. Popular ACR APIs currently in the market include GraceNote™, Audible Magic™ and Civolution™. Video fingerprinting or watermarking may also be used to identify a video title to portion of a video work.

Figure 3:
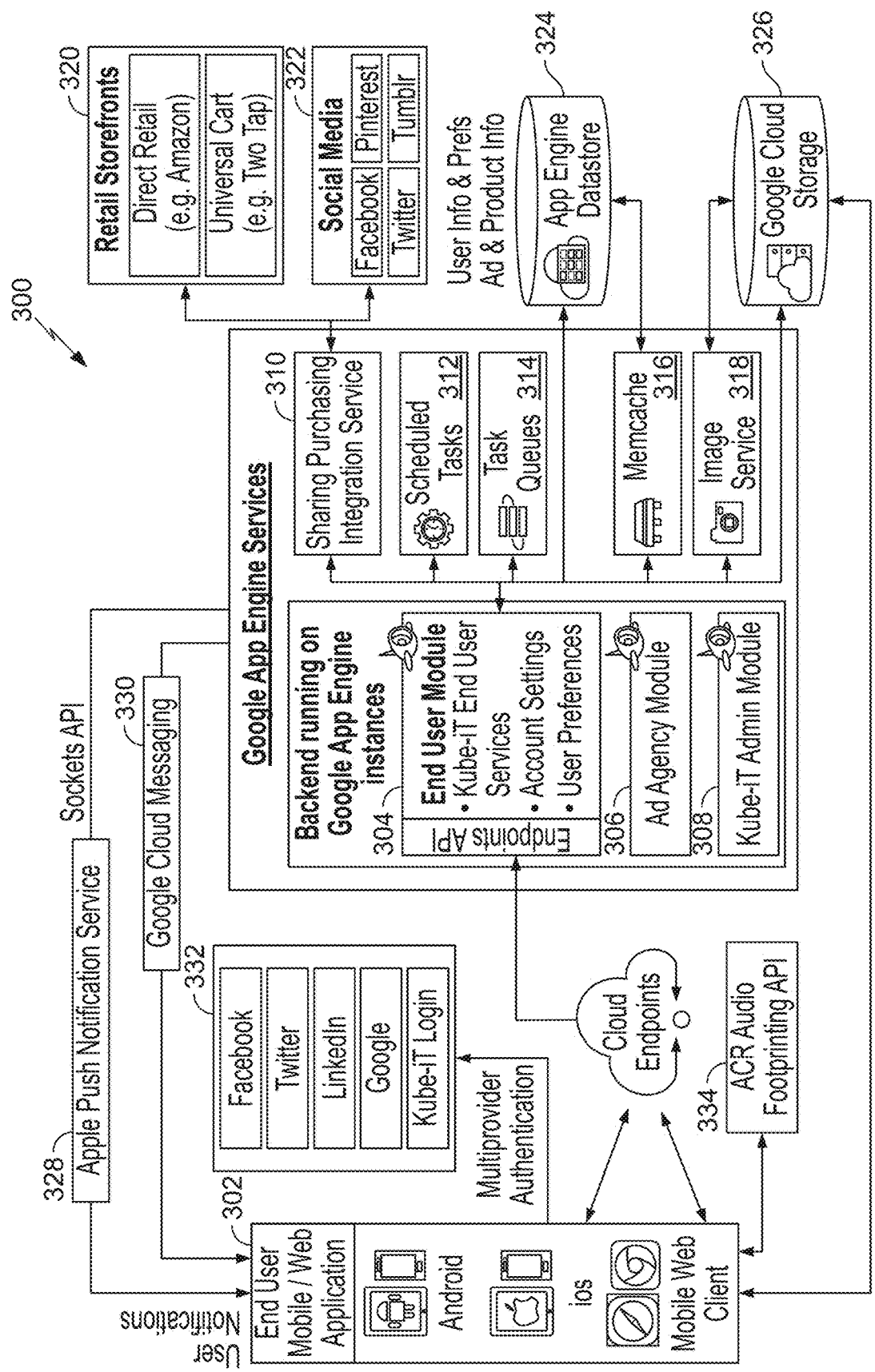
FIG. 3 is a block diagram showing aspects of a technical architecture pertaining to a consumer platform of a system as shown in FIG. 1.

FIG. 3 shows a technical architecture of a system 300 for servicing a consumer platform via an end user application 302 operating on a mobile client device, for example a smart phone or notepad computer equipped with wireless capability. Consumers can access the electronic information card system either through a dedicated mobile application (for example, on an iOS and Android mobile phone) or directly through a mobile/desktop web browser. The system 300 may enable users to download a mobile app from the Apple/Google App store, or other online source. Similarly, the system may enable users to scan an optical (e.g., QR) code available on a system website or online/print marketing collateral to directly go to download page for the application within the user's App Store. Users may login and use this App by:

Creating new account with email and password. Users may go through a two-step verification process.

Authenticating using their existing Facebook, Twitter, Google+ or LinkedIn accounts The mobile/web application 302 may directly connect to the Automatic Content Recognition API 334 (e.g. GraceNote™ Entourage™) to recognize TV shows through audio fingerprinting. In an alternative, video fingerprinting may be used. The End User Module 304 may provide an App Engine backend service to serve all incoming requests from the consumer mobile/web application. The client APIs for the end user module may be built using Cloud Endpoints—a service that generates client libraries for Android, iOS and web-based clients from one source. The End User Module 334 may support the following functionality for the users:

Identify TV Shows: By using the Listen feature, the user can use the App 302 to listen to a show clip and identify the show and episode. Alternatively, users can directly search for the TV show and episode on the device.

Interact with Products: Along with each show/episode, the App 334 may also download information regarding the products associated with that episode (in the form of electronic information cards). Each card may contain multimedia rich product information including product description, product related media (pictures & videos), product vendors and shopping services.

Share/Shop/Save: users may browse downloaded cards to buy the product directly (through available sources), share with friends through email or social media and also save their card to their own personalized wish list.

An End User App 302 may include a sharing feature, which will allow users to share electronic cards that they like or products they have purchased, with their friends on popular social networks. The system 300 infrastructure may provide integration to the social networking sites 322 (Facebook, Google+, Pinterest, etc.) and also leverage an Open Graph Protocol for defining the content to share. The system 300 may provide multiple options for the recipient to interact with the shared cards:

Enable recipient to directly view and buy the product from retailer sites 320;

Enable recipient to view product information on a system website (esp. when viewing through a non-mobile device) and buy from available vendors (optionally create a new user login); and Encourage recipient to download the En User App 302 and/or create a new user login to view the shared product.

In addition, the system 300 may perform analytics on effectiveness and social "buzz" caused by the shared content. For example, all tweets of a "KUBE-iT™" card product may include a "#kubeit" hashtag enabling analysis on number of reshares, responses to tweets, click on shared content, or other metrics.

Integrated Shopping Experience.

The End User App 302 and system 300 may enable an enhanced, integrated shopping experience for users by providing direct integration with popular retailers. The different levels of integration are as below and may vary by the APIs supported by the retailer:

Direct linking to Retailer store 320 (Minimal Integration): Allows the user to directly go to the store website within the App itself and browse the store or complete the transaction.

In-App Product Detail and Preview: Allows the user to directly look up product details and pictures from the retailer's store directly within the system.

In-App Shopping Experience (Complete Integration): Allows the user to view all product information/details from the retailer website and also complete the actual transaction within the App itself (including features to select options like color, size; sign into retail store account; add promo codes).

To provide an enhanced shopping experience for the users, the system 300 may Leverage direct integration with storefronts where available (e.g. Amazon supports the Mobile Associates API that provide integration ranging from direct linking to complete shopping cart integration). The system 300 may use a universal shopping cart service for all other retailers (e.g. "Two Tap" supports over 200 retailers and can provides an integrated in-app shopping experience including signing into the retailer accounts).

Notifications & Geo-Proximity Alerts/Search: the system 300 may enable users to sign up for push notifications on their devices using a push notification service 328, 330. For example, push notifications may be provided for new products added for a show that the user is interested in, when the user is near a retail location that sells one of the products on the user's wish list.

The End User Module 302 may use Scheduled Tasks 312 and Task Queues 314 (Google™ App Engine services) to perform asynchronous notification tasks. For example, a "New Product" Scheduled Task may run every day to check new products added for all supported video titles and send a push notification to users who have added the show as a favorite. In this case, the Scheduled Tasks may identify all users to send notification alerts and add the notification tasks to the Google App Engine "New Product Notification" Task Queue. The Task Queue may be so configured that either the end user module (running on App Engine) or a separate service (running on Compute Engine) can pick up the items on the task queue and send out notifications to the users.

Similarly the system may enable users to perform Geo-Proximity Search for retail locations selling products listed on information cards of the system 300. For example, if a particular product is sold on Nordstrom™, system users may search using a Google™ Search API to perform the geo-proximity search. The Scheduled Tasks service 312 may also perform daily maintenance and clean-up tasks that need to run at pre-scheduled times.

Figure 4:
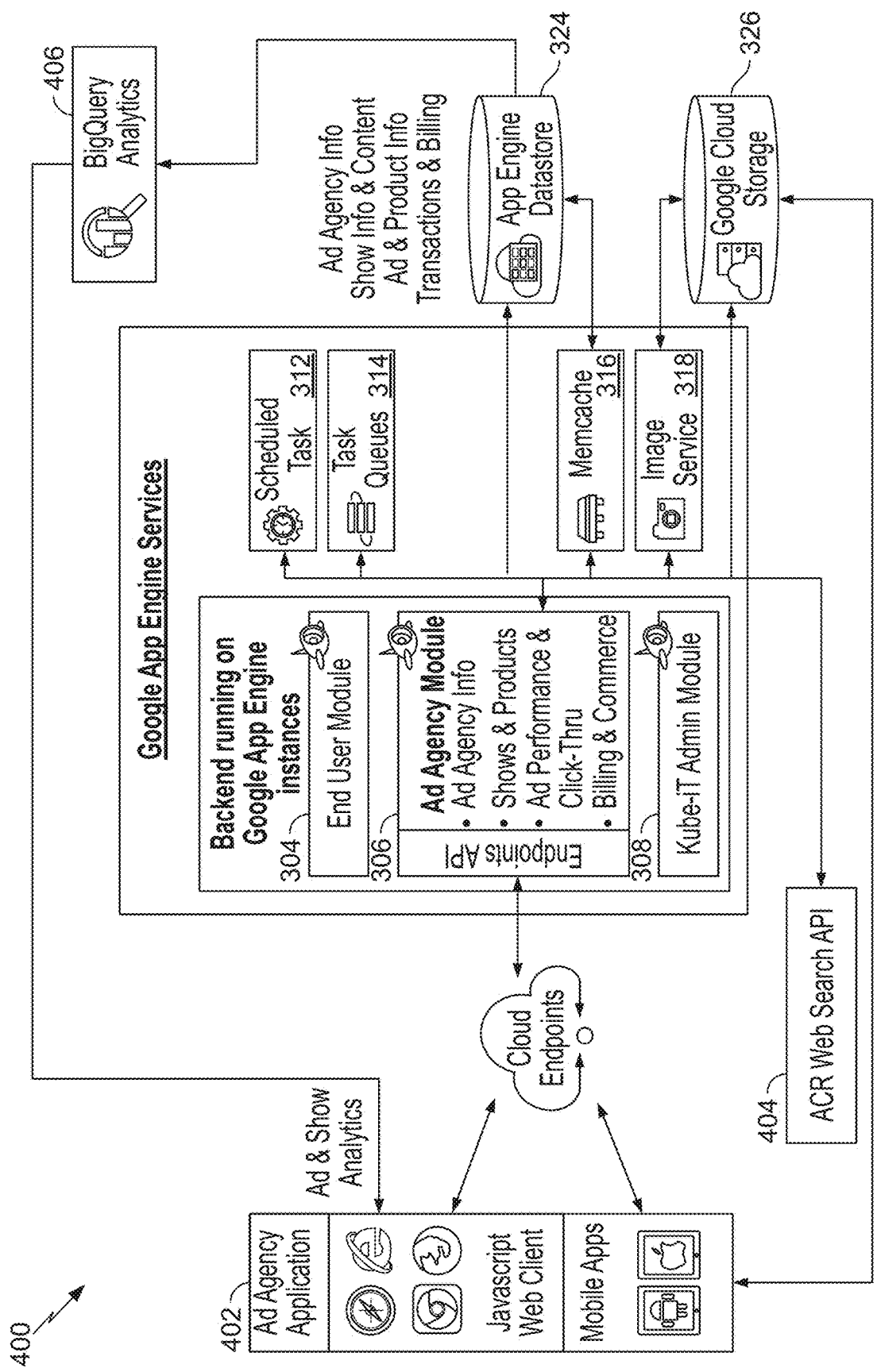
FIG. 4 is a block diagram showing aspects of a technical architecture pertaining to an advertiser platform of a system as shown in FIG. 1.

A technical architecture for an Ad Agency system 400 is shown in FIG. 4. Ad Agency advertisers may access Advertiser services through a system website (available on any JavaScript enabled mobile/web browser) serviced by the Ad Agency Module 306. The Ad Agency Module 306 may be an App Engine backend service to implement the user interface and serve incoming requests from the Ad Agency web application 402. Though the application is web-based, the client APIs for this module may be built using Cloud Endpoints so as to enable easy integration with a mobile application platform.

The Ad Agency Module may support the following functionality for advertisers:

Account & Billing Preferences: Once the account is setup and provisioned by admins, Ad Agency advertisers can manage their account info and settings. They can add other users within their organizations to access the services and setup necessary logins and permissions. They can update their billing details and also register for additional services (e.g. enhanced analytics service).

Manage Shows/Vendors/Products: Advertisers can search for specific shows/episodes and create/manage Product Cards (product description, images/videos, vendors and sale links) for that episode.

Promotions & Coupons: Advertisers will be able to send special offers and coupons, only through the systems described herein, to their consumers to entice them to buy the items on their Product Cards.

Billing & Transaction Details: Advertisers may access all billing information including weekly/monthly billing summary, billing by show/products and past transactions.

The system 400 may provide a comprehensive Advertiser Analytics interface for Advertisers to measure the performance of their advertisements and also better understand consumer behavior. The analytics platform will provide valuable insights that advertisers can use to push targeted promotions and coupons through the system 400. Using the Analytics dashboard, advertisers may:

See real-time data and generate reports on consumer metrics for their advertisements (consumer downloads, likes, shares, click-thru to buy, click-thru to detailed info, etc.);

See real-time data and generate reports on billing data and metrics for their advertisements (e.g. consumer engagement, reach, CPC, CPA, CPM, CTR, CTA); and Analyze consumer purchasing and behavior trends based on demographic information (age, gender, marital status, locale, income, etc.) for system advertisements (by product category, show, etc.).

In the backend, the basic analytics requests (e.g. clicks associated with a particular product, etc.) may be handled by the Ad Agency Module that will query the memory cache/datastore for the required information. Other complex analytics that require big data processing (e.g. demographics and location of users who have downloaded any product for a particular show) will be handled by the Google BigQuery analytics 406 engine.

Figure 5:
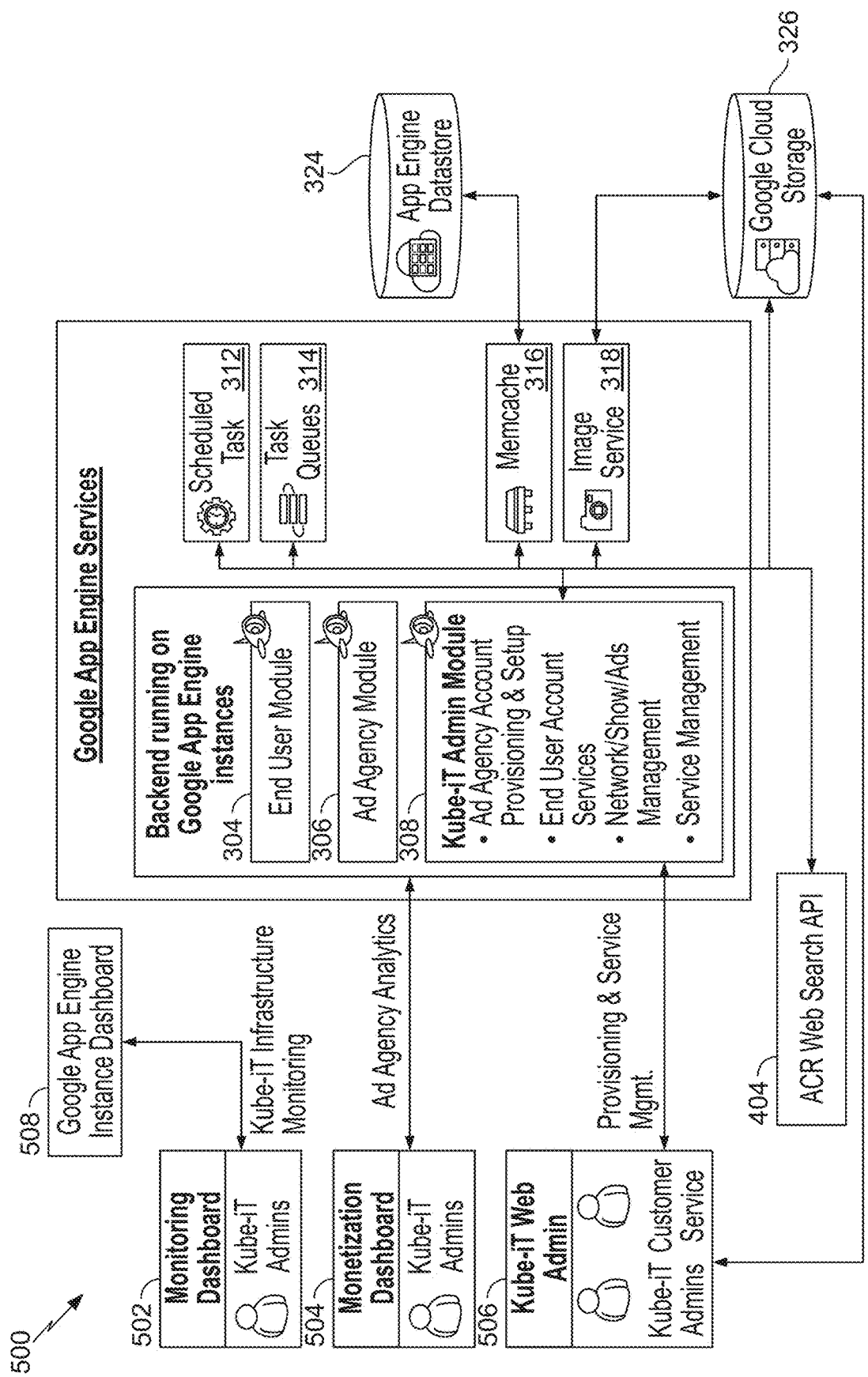
FIG. 5 is a block diagram showing aspects of a technical architecture pertaining to an administrative platform of a system as shown in FIG. 1.

A technical architecture for an Administrative and Internal Services system 500 is shown in FIG. 5. Administrators may access the following services to provision and manage the services and also monitor the overall infrastructure. A Web Admin module 506 enables administrators and customer service representatives to provision and manage system services for customers and advertisers. The Admin module 308 running on Google App Engine will service all incoming request from the Web Admin module 506 and will provide the following services:

For Advertisers
  Admins will be able to provision a new account for an ad agency (i.e. add users, set up logins, provide access to system services, create/update company and billing contact/details)
  Admins can create/manage network/show/vendor information as required
  Admins can view all currently live and disabled products being advertised and create/manage products on behalf of the advertisers
  Admins will be able to view/update Advertiser billing details, current balance and past payment transactions For Consumers
  administrators will be able to perform password resets for consumers with logins.

The system 500 may include a Monetization Dashboard module 504 to review/analyze advertisement performance metrics as well as overall ad agency revenue and performance (understand month to date, quarter to date and year to date usage of information card services, revenue generated, etc.)

The system 500 may include an App Engine Instance Dashboard 508 to review the health and performance of the overall KUBE-iT™ card infrastructure. The Dashboard will show the currently running instances assigned to the system applications along with details on average QPS, average latency, # requests over the last minute, current memory usage and age of instance. Users can shutdown/create new instances as well as modify application settings that impact application performance and scalability.

Further details concerning the systems 100-500 may be as described in the appended "KUBE-iT™ card Technical Architecture Whitepaper."

Figure 6:
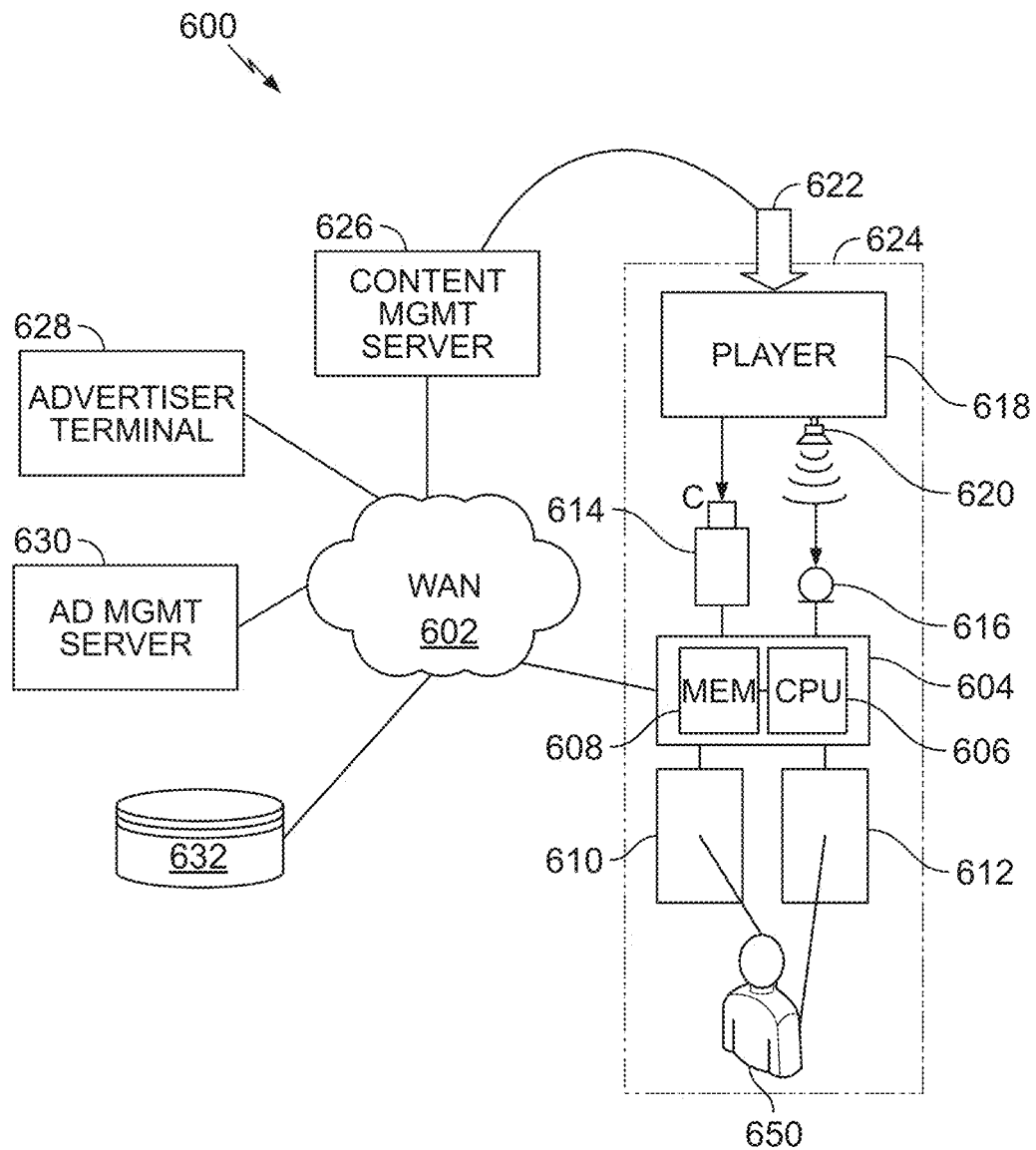
FIG. 6 is a concept diagram illustrating other aspects of systems as shown in FIGS. 1-5.

FIG. 6 is a concept diagram illustrating other aspects of systems as shown in FIGS. 1-5. A system 600 may include a client device 604 (e.g., mobile smartphone) including a processor 606 coupled to a memory 608, to a display screen 610 and audio output transducer (not shown), and to a user input device, for example a touchscreen 612 that may be layered into the display device 610. The processor 606 may further be coupled to other input sensors, for example an audio input transducer 616 (for example, a microphone) and optionally a digital camera 614 including a lens and digital image sensor. A user 650 may view the display screen 610 and provide touch input via the user input device 612 or audio input via the input transducer 616. The client device 604 may be located in a locality 624 which may be, for example, an interior room of the user's residence, a portion of a retail space, or anywhere sufficiently close to the player device 618 to enable the user 650 to experience audio and video content output by the player device or and within range of the sensors 614, 616.

The player 618 may receive encoded audio or video content 622 comprising a video or audio title (e.g., a show, song, or program) from any source, for example a content management server 626. The player device may output the show or program on a display screen, for example an LCD, DLP, LED projector, or other display device with audio output from an audio output transducer 620. Other elements of system 600 may include an advertising terminal 628, ad management server 630 and data store 632, which like the client device may be coupled through one or more wired or wireless networks, for example, a Wide Area Network (WAN).

Figure 7:
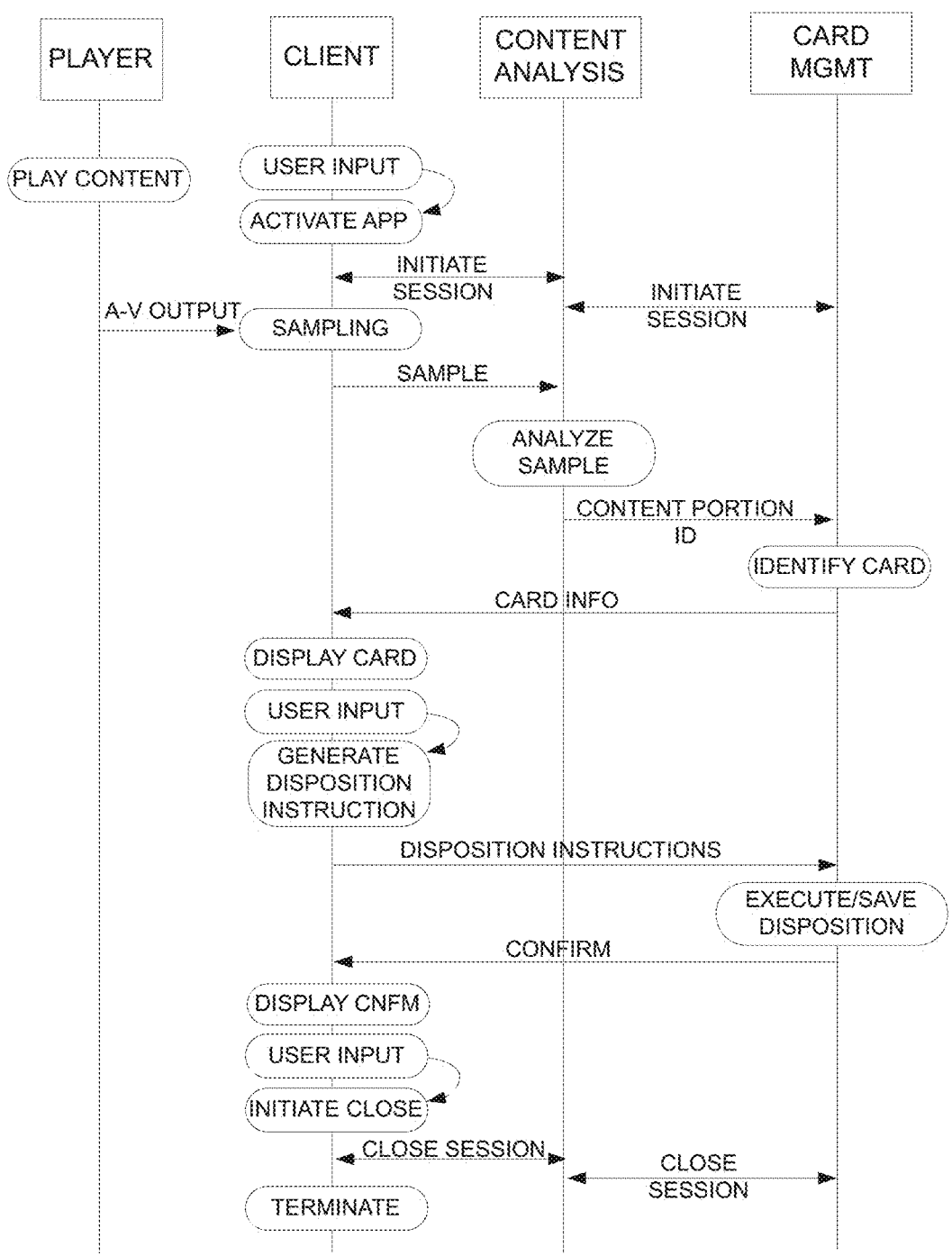
FIG. 7 is a sequence diagram illustrating aspect of a use case for a KUBE-iT™ card information management system.

FIG. 7 is a sequence diagram illustrating aspect of a use case 700 for a card information management system like system 600, involving a player device 702, a client device 704, and content analysis (e.g., ACR) server or module 706, and an electronic information card management server 708 in communication with the content analysis module 706 and client device 704 via one or more wired or wireless networks. The player device 702 need not be connected to other nodes of the diagram via any network, and in the general case may be considered uncoupled. A user may initiate playing of content 712 by the player 702 or encounter the player already playing the content, comprising some audio or video title or segment. Recognizing that the content is "KUBE-iT™" card enabled (for example by a logo presented onscreen) the user may start up the end user application. Accordingly, the client device 704 may receive user input 710 and activate an end user application 714 from a device memory. Subsequently, the application may cause the client device 704 to initiate a session 716 with a content recognition service 706, e.g., an ACR server. The service 706 or device 704 may in response initiate a session 718 with a card management server 708.

Once the session 716 is initiated, the client 704 may detect electro-magnetic signals (e.g., optical, radio, or infrared) from the player device or audio signals (sound) resulting from audio or video output 720. The client 704 may initiate a sampling routine to capture a sample or representation 722 of the detected signals and provide the sample 724 or representation to the content analysis service 706. The content analysis service 706 may analyze the sample 726 to identify the content title playing on the player device 702, and optionally, a time or portion of the title from which the sample was taken. Once the sample is recognized, the content analysis service 706 may provide 728 a content identifier, with or without a portion/time identifier to the card management server 708. In response to receiving the identifier(s) 728, the card management server identifies a set of information for an electronic card that is associated with the identifier(s), using a relational database or the like. The card information may include, for example, a product image(s) and description, price and vendor(s) identity.

Upon identifying the card information, the card management server 708 may provide 732 the information to the client device 704. In response to receiving 732 the information from the server, the client 704 may display an interactive electronic information card including the information 734. The user may view the card and provide responsive input 736 through its interactive features, or provide no response. The client 704 may detect the user input 736 or lack of user input and generate a disposition instruction regarding the card 738, for example, "keep in such-and-such wishlist," "share with so-and-so," or "discard—no interest." Upon generating such instructions the client 704 may provide the instructions 740 in a coded transmission to the card management server 708.

Upon receiving the instructions, the card management server 708 may execute the same and save a record of the disposition in a tracking database. Optionally, the server may transmit a confirmation 744 to the client that the instructions were executed. In the alternative, the instructions may be provided directly from the client 704 to another third-party server, for example to a social networking site for sharing, or to an e-commerce server for initiating a purchase or other transaction.

Upon receiving confirmation of execution 744, the client may display a confirmation message 746 on its display screen. The operations 712-744 may be repeated for so long as the content will play or the user desires. When it is time to stop the information card session, user input may be received 748 indicated a termination request. In response, the client device 704 may initiate a closing sequence 750, including, for example, closing its session with the analysis server 706, which in turn may cause the server 706 and 708 to close a session. After closing operations are completed, the client device may terminate 756 the end user application.

Figure 8:
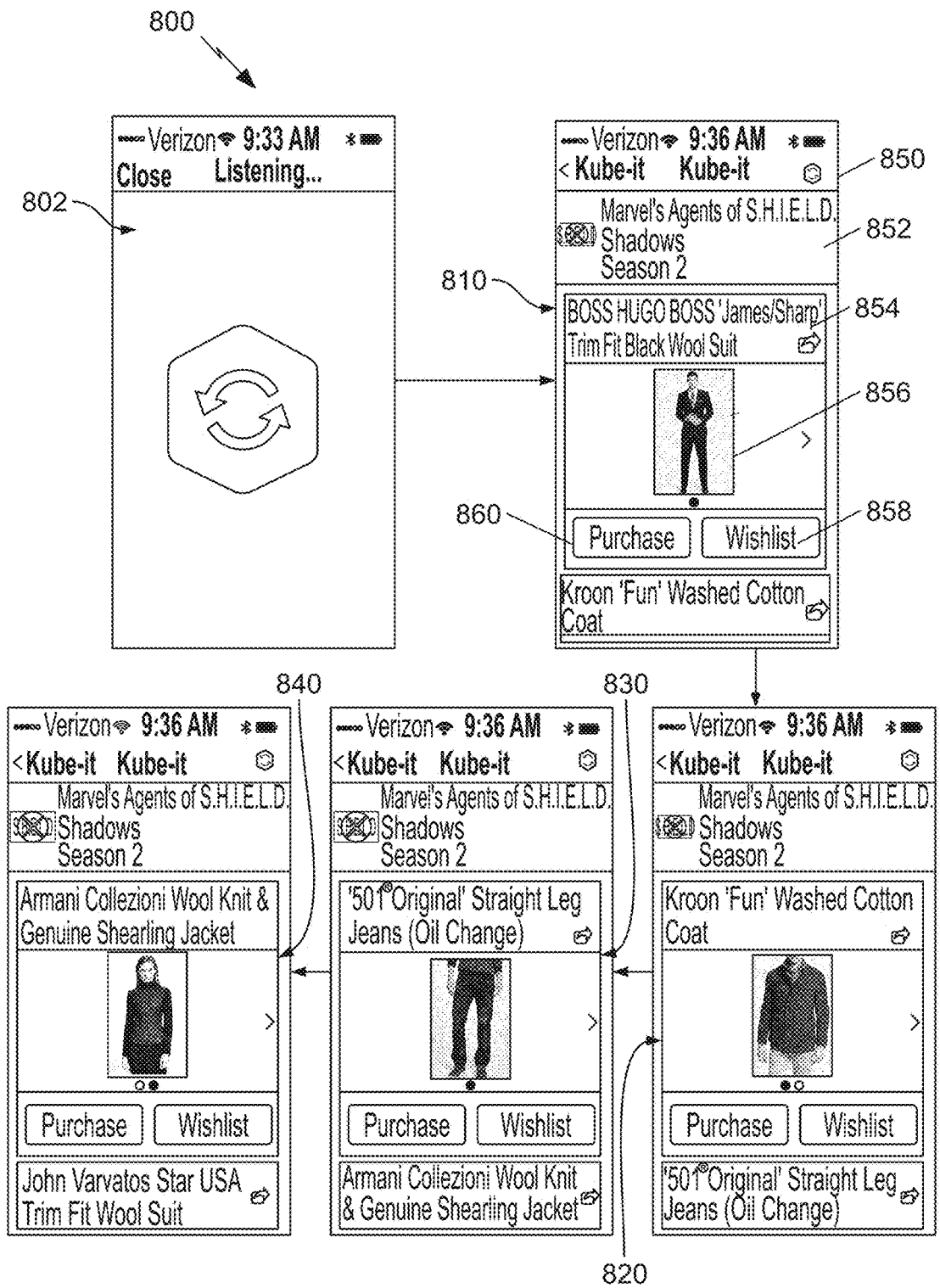
FIG. 8 is a sequence of screenshots illustrating aspects of a user interface of a client device for display and management of KUBE-iT™ cards.

Novel aspects of the technology include the user interface configurations, enabling advertising to end users in a way that enhances and does not interrupt their enjoyment of video content, using sensor-based sampling and display on a client device auxiliary to the content player device. FIG. 8 is a sequence of screenshots 800 illustrating aspects of a user interface of a client device for display and management of KUBE-iT™ cards. During signal sampling, an end user application may display a "listening" screen 802. Once the content portion is identified and the client receives card information, an initial interactive electronic information card 810 may include an application status bar 850, content identification field 852, product description 854, product image 856, purchase interactive object 860 and wishlist interactive object 858. The user may scroll through a sequence of such cards 820, 830, 840 until finding one advertising a subject of interest. Old cards may be retained for a period of time, and automatically deleted from the client device if not saved in a wishlist.

Figure 9:
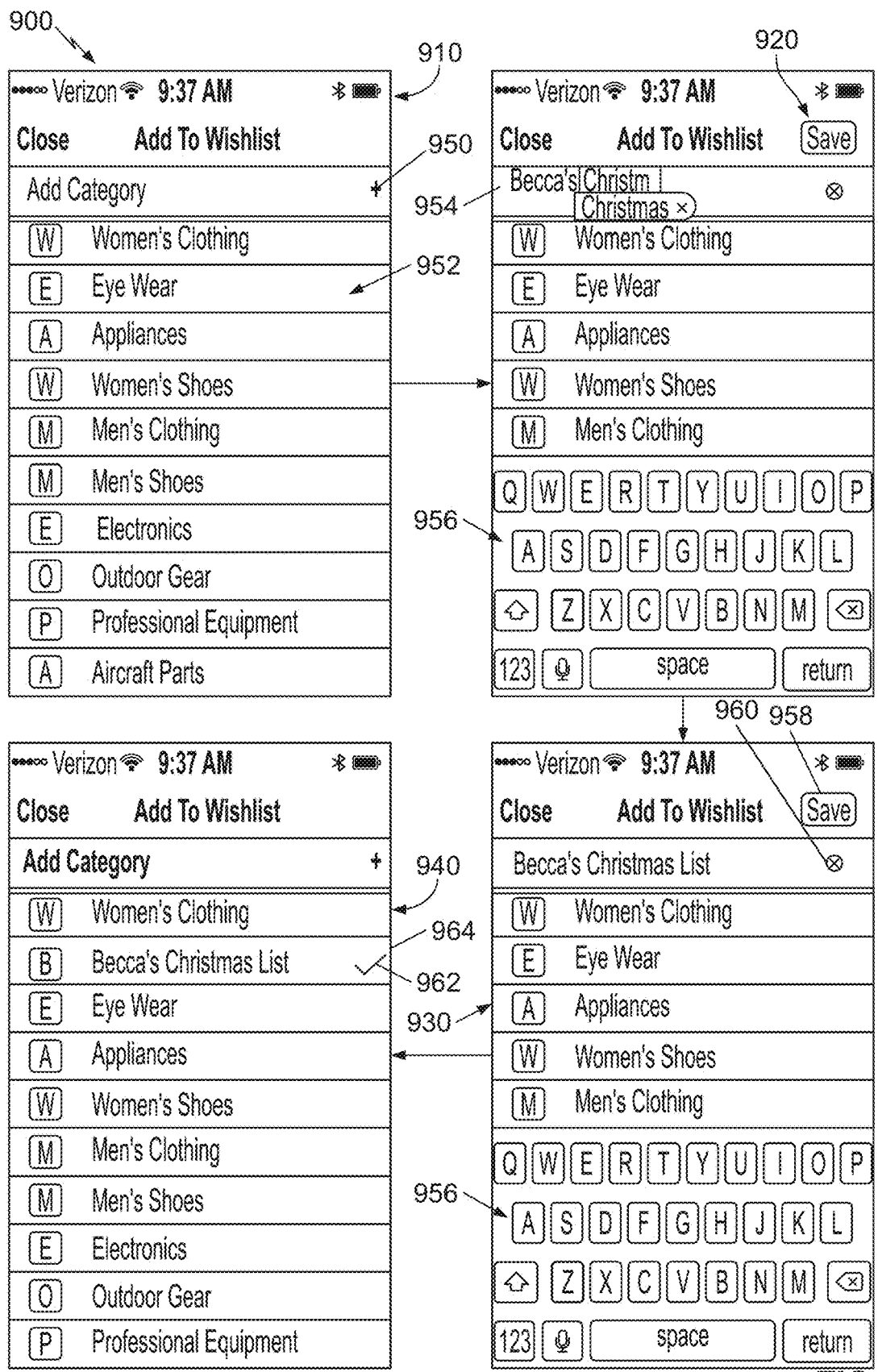
FIG. 9 is a sequence of screenshots illustrating aspects of a user interface of a client device for setting up a category indicator for managing saved KUBE-iT™ cards.

FIG. 9 is a sequence 900 of screenshots illustrating aspects of a user interface of a client device for setting up a category indicator for managing saved KUBE-iT™ cards. The user interface enables a user to save cards in a personal wishlist for organization, and/or share them and send out. A user may also share contents of a category with others, as a wishlist or gift suggestion list. An initial screen 910 may include an interactive object 950 for adding a new category (i.e., wishlist) and a list of existing categories. Upon selecting the "add category" object 950, a second screen may include a text entry field 954 and keypad object 954; voice-to-text may also be used. Once the new category name is specified based on user input as shown in screen 930, the user may select a "save" object 958 to save the category or a "cancel" object 960 to undo. If the user input indicates "save," a next screen 940 may show the new entry 964 in the category list with a confirmation indicator 962 showing that the item has been saved in the new category. Alphabetical icons in the left-most column of the category list may be used to drill down to categories beginning with the specified letter only.

Figure 10:
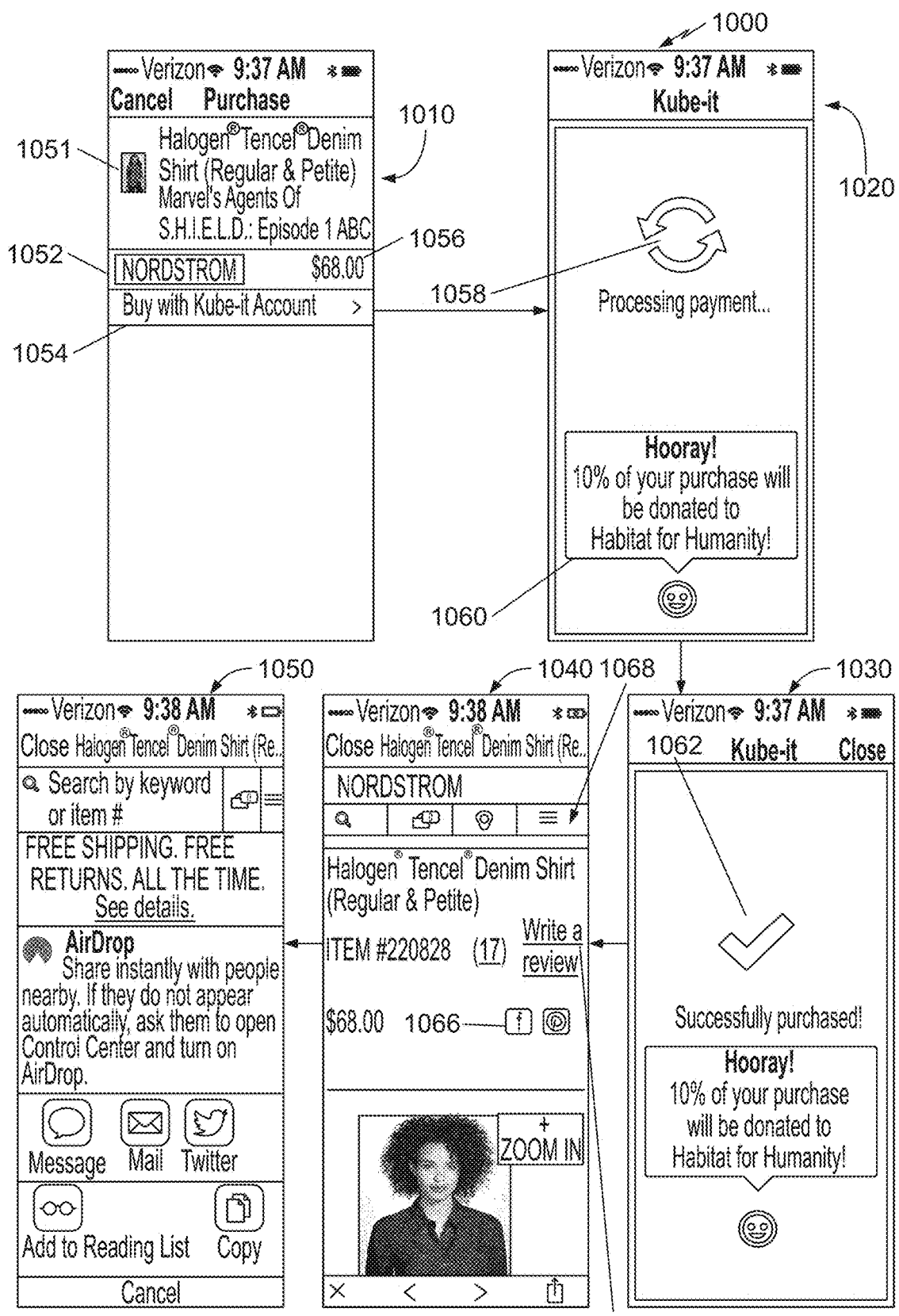
FIG. 10 is a sequence of screenshots illustrating aspects of a user interface of a client device for purchasing a product described on a KUBE-iT™ card.

FIG. 10 is a sequence 1000 of screenshots illustrating aspects of a user interface of a client device for purchasing a product described on an interactive electronic information card. The interface may enable a user to view complete a purchase of a product described on an information card, view product reviews before or after completing the purchase, and to submit a product review after purchase. A first screen 1010 shows a summary of the card 1051, a source field 1052, with corresponding price from that source 1056 (one row of many possible shown), and an interactive "buy" object 1054, in this case interactive text. The display 1010 may appear as part of a list of cards in a wishlist or in a list of recently received cards, for example, or may be provided by scrolling to a portion of an opened and displayed card. If "buy" input is received, the user interface may display a "payment processing" indicator 1058 and supplemental information 1060. An auxiliary message 1060 may also be provided. Specifying a payment method may be done though the mobile interface or web interface at an earlier time. If the payment clears and the transaction is completed, a next screen 1030 may show a success indicator 1062. Prior to or after a purchase, a card screen 1040 may include a link 1064 for writing a product review or interactive icon 1066 for sharing the card information on a social media site. A sharing screen 1050 may show more detailed sharing options including icons for instant messaging, mail, Twitter™ or other modality.

Figure 11:
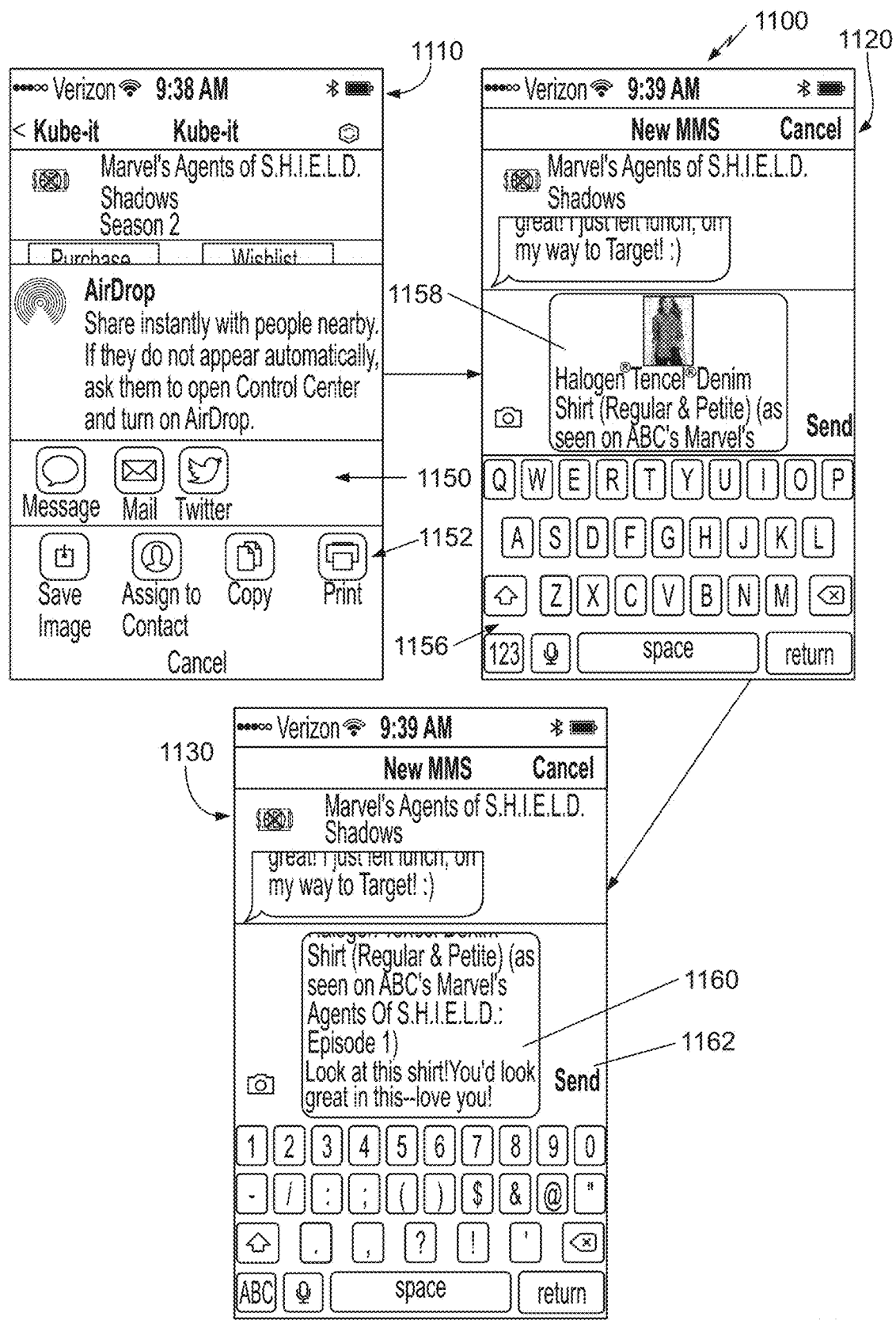
FIG. 11 is a sequence of screenshots illustrating aspects of a user interface of a client device for sharing a KUBE-iT™ card via instant messaging.
Figure 12A:
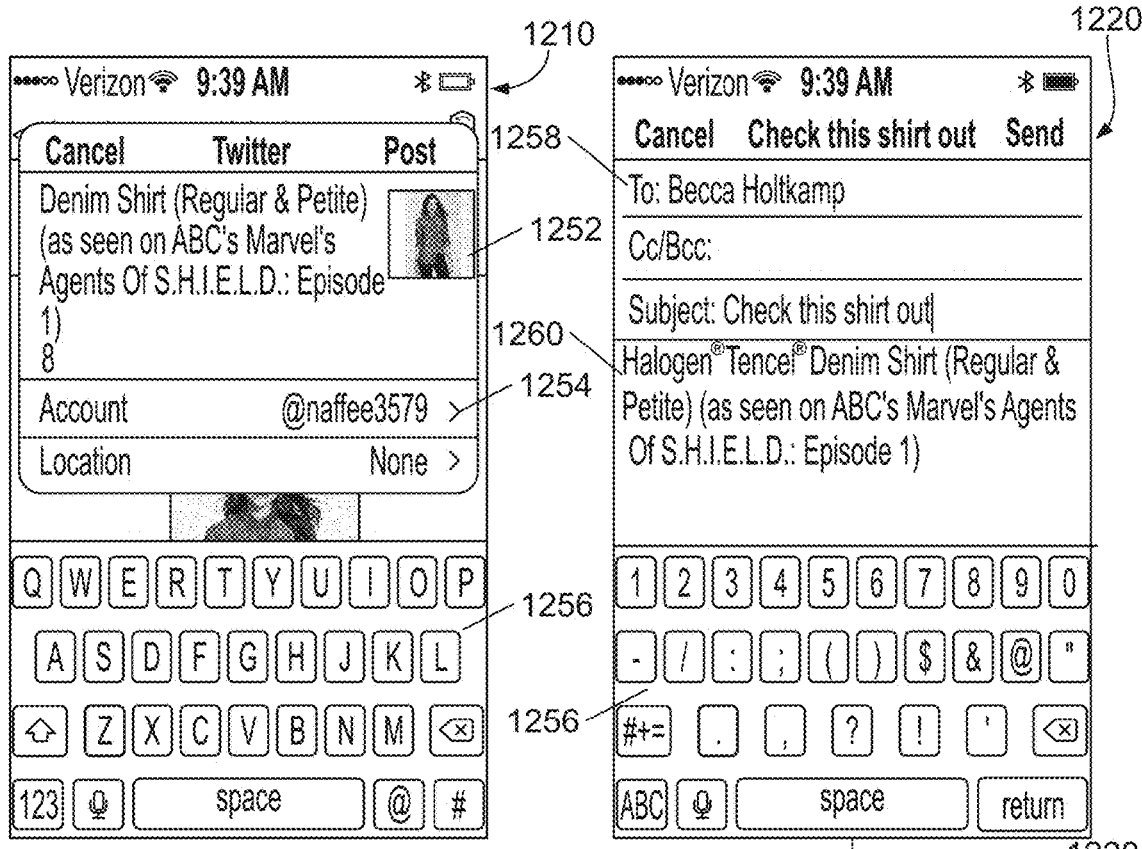
FIGS. 12A-B show screenshots illustrating aspects of a user interface of a client device for sharing a KUBE-iT™ card via various modalities (tweet, e-mail, or social networking site).
Figure 12B:
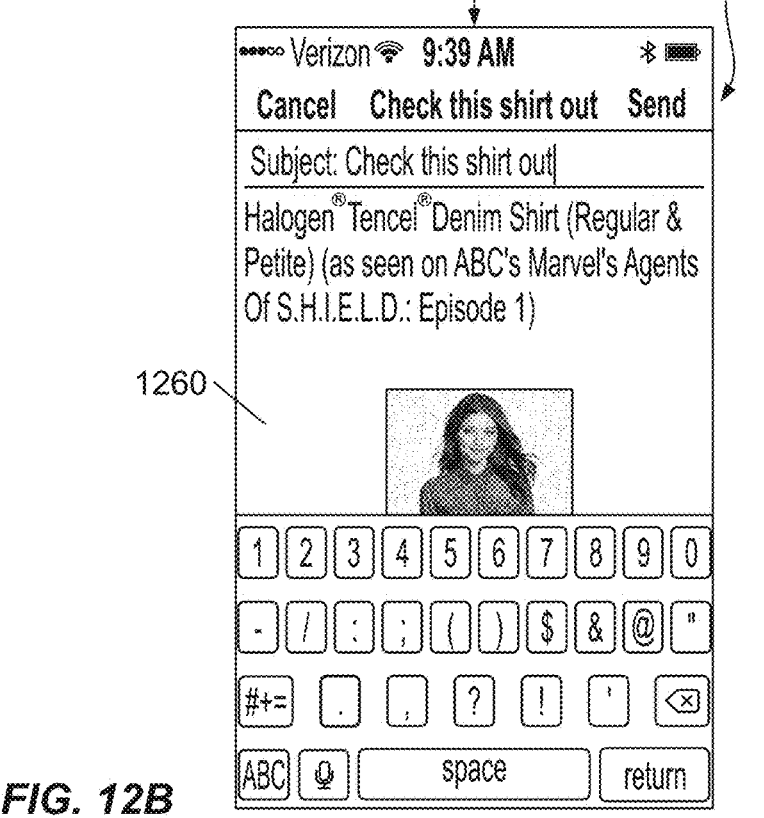

FIG. 11 is a sequence 1100 of screenshots illustrating aspects of a user interface of a client device for sharing information form an electronic information card. An initial screen 1110 may show sharing modalities 1150 and other disposition options 1152. A next screen 1120 may be displayed in response to user selection of an instant messaging sharing modality, and may include a summary 1158 of the card information with a key pad interface 1156 for adding additional text. For example, at screen 1130, the user has entered additional text 1160 and when ready may select at "send" command 1162 (or cancel the message). FIG. 12A shows a screen 1210 of the user interface for tweeting card information, including an information summary 1252, a user account field 1254, and key pad interface 1256 for adding text. FIG. 12B shows a screen 1220 for an email sharing modality, including an addressee line 1258, a text field 1260, image 1260 and keypad 1256 for additional text. Thus, sharing is convenient within the mobile user interface.

FIG. 13 shows operations of a method 1300 by a client device for synchronizing and display of an interactive card-like data object on the client device to external events detected. FIGS. 14-17 illustrate optional operations or aspects 1400, 1500, 1600 or 1700 of the method of claim 13, any one or combination of which may be combined with the operations of method 1300, in any operative order. The method 1300 may include generating 1310, by a client device, a signal sample based on at least one of an audio or video signal output by a player device that is playing a recorded audio work, recorded video work, or recorded audio-video work, wherein the player device is distinct from the client device. The client device may be, for example, a mobile smart phone with an interactive touch screen, microphone, camera, transceiver for a wireless phone network, processor, and memory, among other things. The player device may be any other machine, computerized or not, that produces audio or video output from a digital or analog recording, including output from streaming audio or video content. The sample may be generated by recording audio output from the player device using the microphone of the client device, or by some other method.

The method 1300 may include obtaining 1320, using the client device, information relating to an object that is imaged or referred to in a portion of the recorded audio work, recorded video work, or recorded audio-video work from which the signal sample is generated, based on the signal sample. Referring to FIGS. 13-14, the obtaining 1320 may include, for example, identifying 1410, using the client device and/or the server, the recorded audio work, recorded video work, or recorded audio-video work and the portion thereof from which the signal sample was generated, based on the signal sample, and locating the information based on an identity of the recorded audio work, recorded video work, or recorded audio-video work and the portion. In the alternative, or in addition, the method 1300 may include transmitting 1420 the signal or a representation of the signal to a database application operating on a server, obtaining the information, and receiving the data record from the server. The object may be imaged in a visible portion of output from the recorded video or audio-video work. In the alternative, or in addition, the object, or metadata about the object, may be imaged or referred to in a non-visible portion, e.g., an audio portion, of the recorded audio work or recorded audio-video work. The audio work, video work, or audio-video work may be recorded in a non-transitory medium, for example, an electronic memory storage device, a magnetic computer-readable medium, or an optical computer-readable medium.

Figure 15:
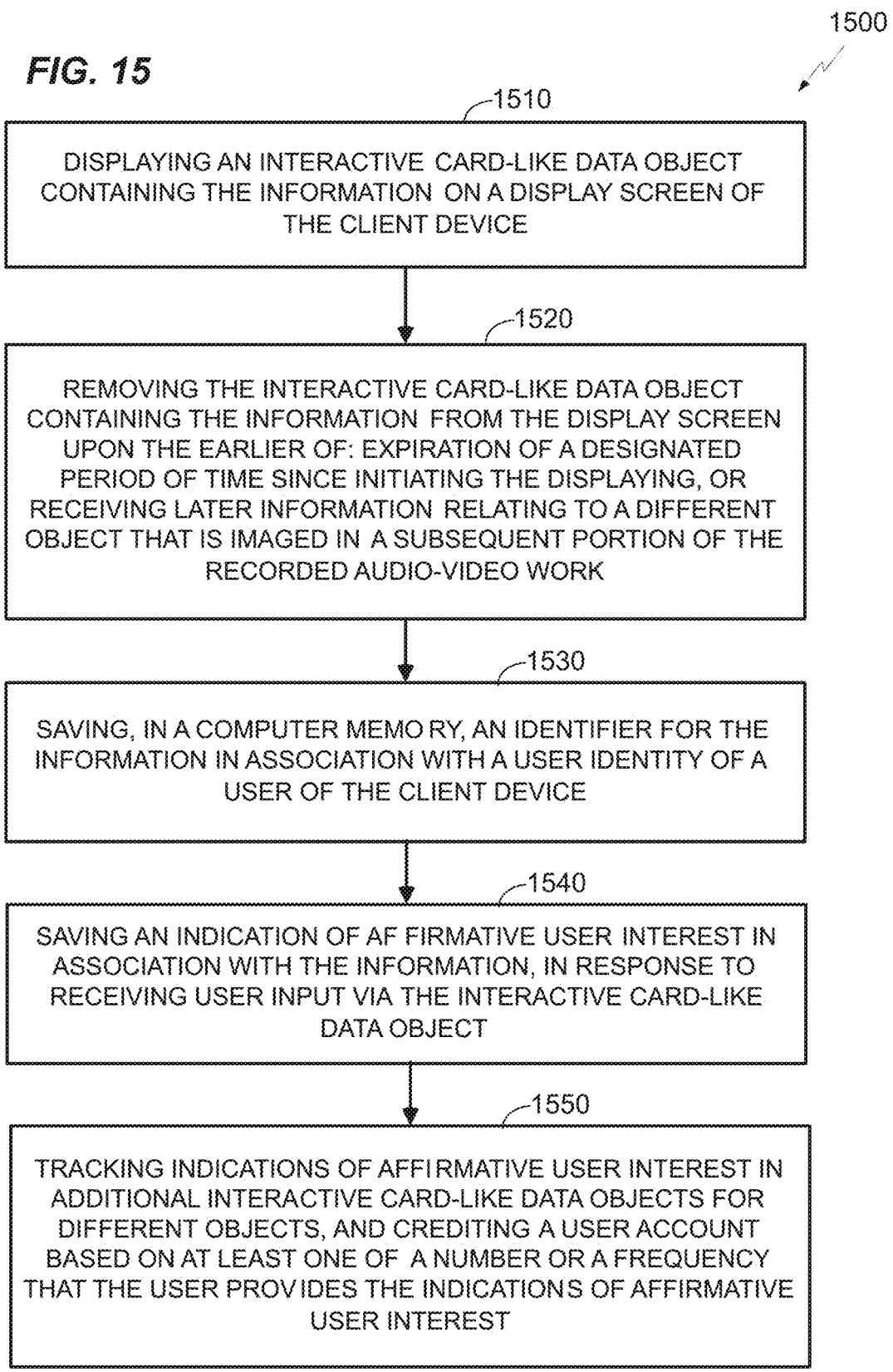

The method 1300 may further include outputting 1330 the information in an interactive user interface of the client device, in response to obtaining the data record, while the audio or video work is playing on the player device. Referring to FIG. 15, outputting the information may include displaying 1510 an interactive card-like data object containing the information on a display screen of the client device. The card-like data object, sometime referred to herein or in the accompanying materials as a "KUBE-iT"™ card, or "card" for short, may comprise a user interface object that includes information about the imaged object, links to further information about the object, and command objects or links to a command interface for user-controlled disposition of the KUBE-iT™ card. Disposition may include, for example, saving the card in a default category of a user database, saving the card in a user-specified category of a user database, sharing the card with a designated user, adding a card to a wish list, expressing interest in a card, expressing disinterest in a card, discarding a card, requesting further information about an object described by a card, a combination of the foregoing or other disposition. Data regarding cards received by the client device and any related dispositions may be stored in a memory related to a user account, for example, in a cloud-based storage collection of records associated with a particular user name.

Absent receipt of a user command directing a specific disposition of a card, the method may include removing 1520 the interactive card-like data object containing the information from the display screen upon the earlier of: expiration of a designated period of time since initiating the displaying, or receiving later information relating to a different object that is imaged or referred to in a subsequent portion of the recorded audio work, recorded video work, or recorded audio-video work.

The method may further include saving 1530, in a computer memory, an identifier for the information in association with a user identity of a user of the client device. For example, the method may include saving 1540 an indication of affirmative user interest in association with the information, in response to receiving user input via the interactive card-like data object. In another aspect, the saving may include sending the information and category location to the computer memory located in a network location in association with an account identifier enabling access to the information and category using other client devices.

In another aspect, the method may include tracking 1550 indications of affirmative user interest in additional interactive card-like data objects for different objects, and crediting a user account, for example with reward points, based on at least one of a number or a frequency that the user provides the indications of affirmative user interest.

Figure 16:
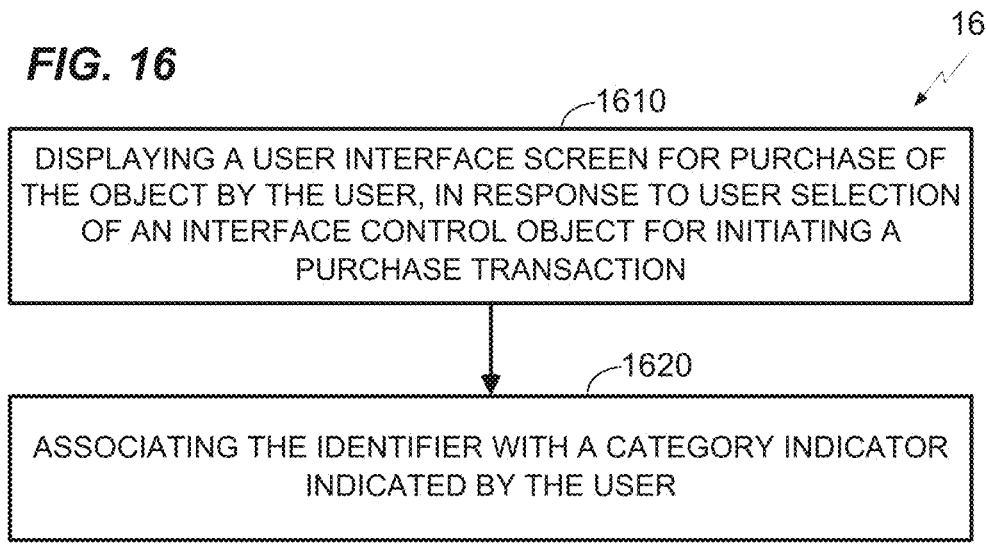

Referring to FIG. 16, the method 1300 may further include displaying 1610 a user interface screen for purchase of the object by the user, in response to user selection of an interface control object for initiating a purchase transaction. The method may include, for example, associating 1620 the identifier with a category indicator indicated by the user.

Figure 17:
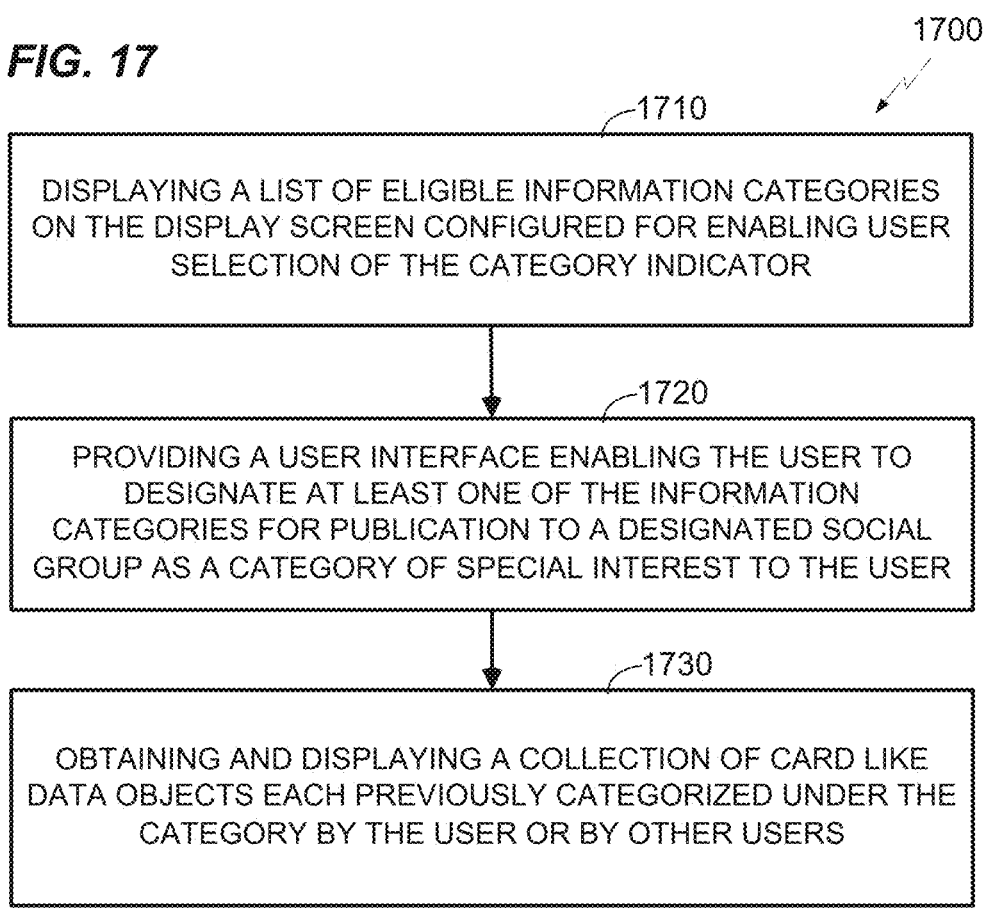

Referring to FIG. 17, the method 1300 may include displaying 1710 a list of eligible information categories on the display screen configured for enabling user selection of the category indicator. The method may include providing 1720 a user interface enabling the user to designate at least one of the information categories for publication to a designated social group as a category of special interest (e.g., a wish list) to the user. The method may include, in response to user selection of a category on the list, obtaining and displaying 1730 a collection of card like data objects each previously categorized under the category by the user. The method may include, in response to user selection of a category on the list, obtaining and displaying a collection of card like data objects each previously categorized under the category by other users who have designated the category as shared with the user.

In another aspect, KUBE-iT™ card data may be provided based on geo-location or other location-based trigger such as, for example, receiving a wireless signal from a signaling device placed in a retail location. Accordingly, the method may include obtaining, using the client device, object information related to an object selected based on a current location of the client device, and outputting the information at least in part by displaying another interactive card-like data object containing the object information on the display screen. This provides the convenience of the KUBE-iT™ card information management in contexts other than viewing recorded audio-video or audio-only content.

Figure 18:
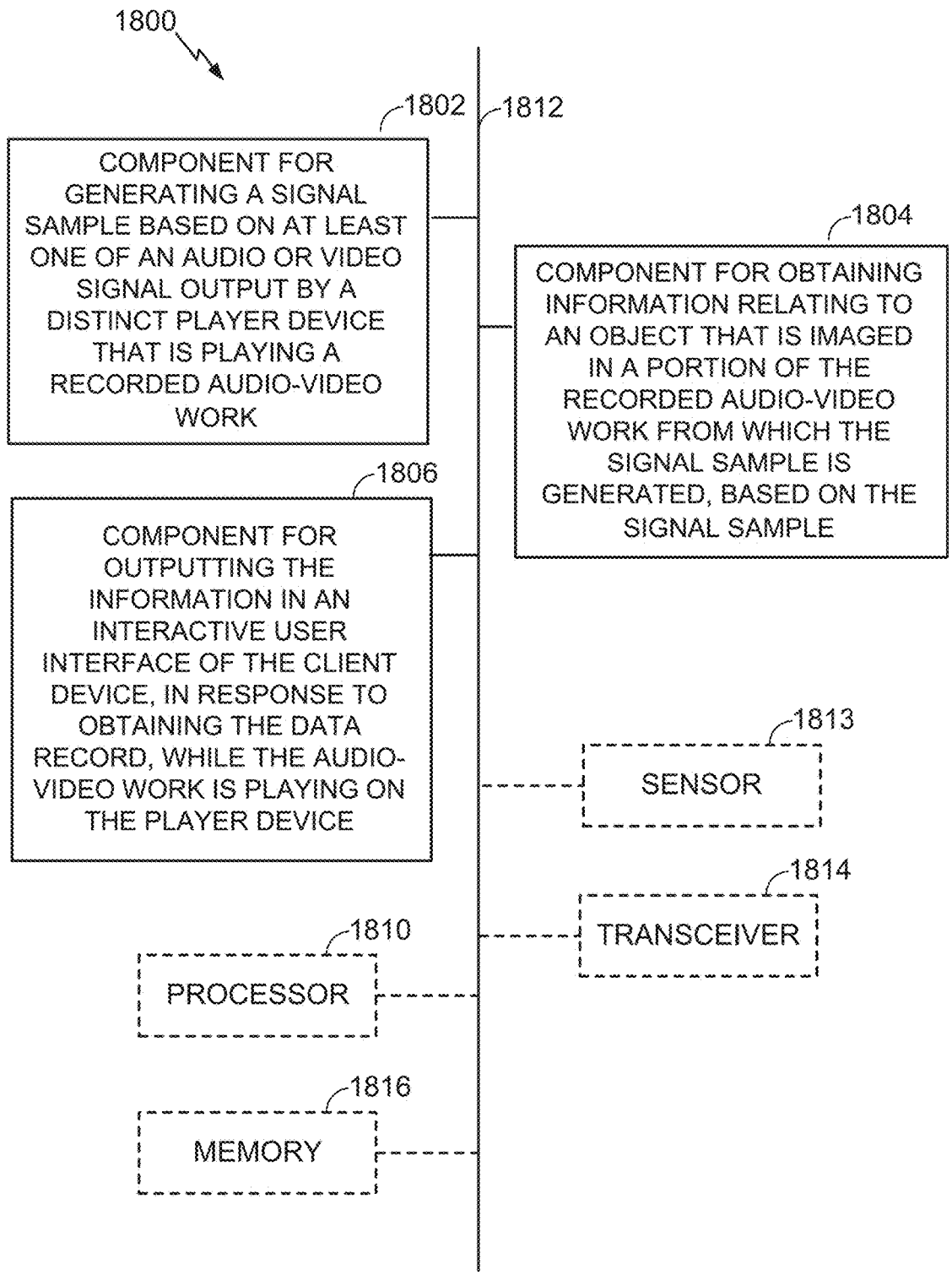
FIG. 18 is a block diagram illustrating aspects of a client-side device for performing a method as shown in FIGS. 13-17.

With reference to FIG. 18, there is provided an exemplary apparatus 1800 that may be configured as a client device including at least one sensor, display screen, user input device, processor, memory and wireless transceiver, or as a processor or similar device for use within the client device. As depicted, the apparatus 1800 may include functional blocks that can represent functions implemented by a processor, software, or combination thereof (e.g., firmware).

As illustrated in FIG. 18, the apparatus 1800 may comprise an electrical component or the module 1802 for generating a signal sample based on at least one of an audio or video signal output by a distinct player device that is playing a recorded audio work, recorded video work, or recorded audio-video work. The apparatus 1800 may comprise an electrical component or the module 1804 for obtaining information relating to an object that is imaged in a portion of the recorded audio work, recorded video work, or recorded audio-video work from which the signal sample is generated, based on the signal sample. The apparatus 1800 may comprise an electrical component or the module 1806 for outputting the information in an interactive user interface of the client device, in response to obtaining the data record, while the audio or video work is playing on the player device.

With reference to FIG. 18, the apparatus 1800 may optionally include a processor module 1818 having at least one processor, in the case of the apparatus 1800 configured as a smart phone device with camera and microphone. The processor 1818, in such case, may be in operative communication with the modules 1802-1806 via a bus 1812 or similar communication coupling. The processor 1818 may effect initiation and scheduling of the processes or functions performed by electrical components 1802-1806.

In related aspects, the apparatus 1800 may include a sensor 1813, for example a microphone or camera, capable of detecting an audio signal or an electromagnetic signal. The apparatus 1800 may also include a wireless transceiver module 1814. A stand-alone receiver and/or stand-alone transmitter may be used in lieu of or in conjunction with the transceiver 1814. In further related aspects, the apparatus 1800 may optionally include a module for storing information, such as, for example, a memory device/module 1816. The computer readable medium or the memory module 1816 may be operatively coupled to the other components of the apparatus 1800 via the bus 1812 or the like. The memory module 1816 may be adapted to store computer readable instructions and data for effecting the processes and behavior of the modules 1802-1806, and subcomponents thereof, or the processor 1818, or the method 1300 and similar client-side methods disclosed herein. The memory module 1816 may retain instructions for executing functions associated with the modules 1802-1806. While shown as being external to the memory 1816, it is to be understood that the modules 1802-1806 can exist within the memory 1816.

Figure 19:
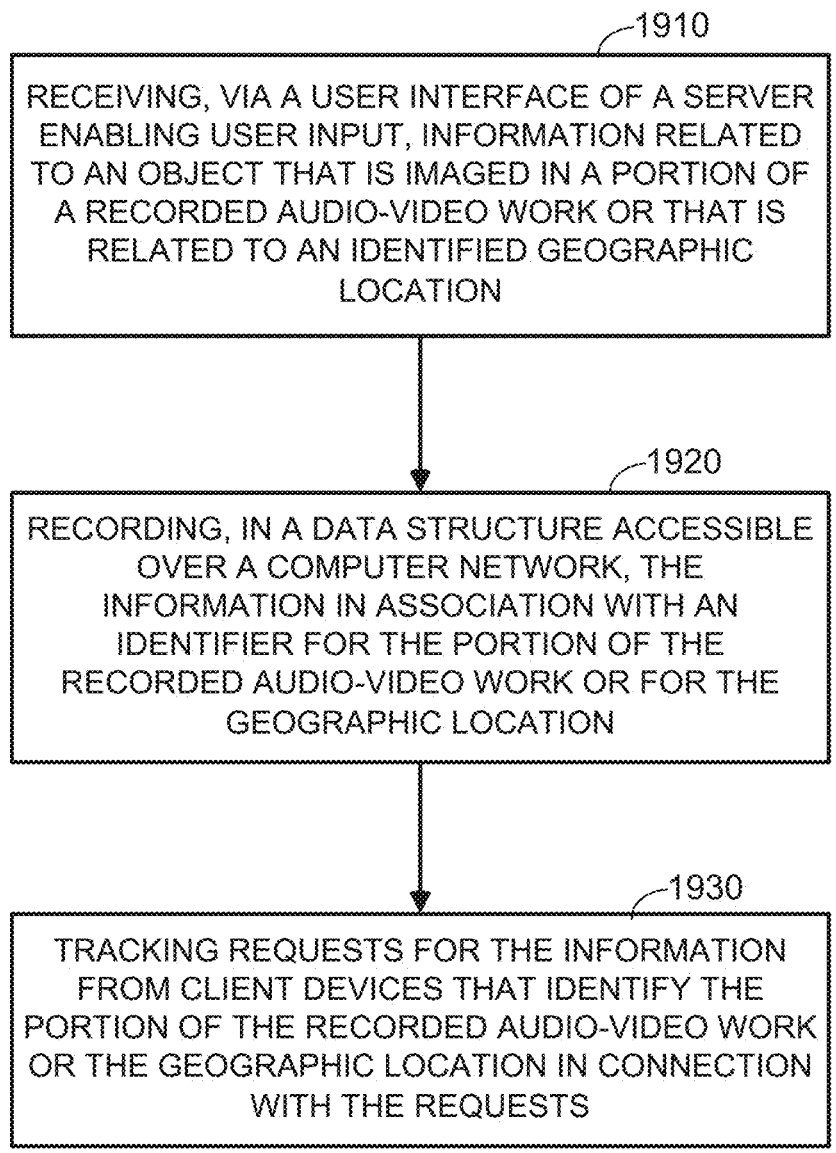
FIG. 19 is a flow chart illustrating aspects of a method by a server that services the synchronizing and display of an interactive card-like data object on a the client-side device.

FIG. 19 is a flow chart illustrating aspects of a method 1900 by a server that services the synchronizing and display of an interactive card-like data object on a the client-side device. The method 1900 method may include receiving 1910, via a user interface of a server enabling user input, information related to an object that is imaged or referred to in a portion of a recorded audio work, recorded video work, or recorded audio-video work or that is related to an identified geographic location. For example, the server may transmit a user interface object to a terminal, in response to a receiving a request directed to a Uniform Resource Locator (URL) or some other identifier that the server is configured to identify. The user interface object may include code that executes on the terminal in response to user selection of a user interface element of a web page that is accessed on the terminal via a web browser. The code may include one or more modules for describing or identifying the object that is imaged or referred to in a portion of a recorded audio work, recorded video work, or recorded audio-video work or that is related to an identified geographic location in response to user input to the terminal, and relating the object to a portion (e.g., time line segment) of a particular audio or video work or to a geographic location.

The server-side method 1900 may further include recording 1920, in a data structure accessible over a computer network, the information in association with an identifier for the portion of the recorded audio work, recorded video work, or recorded audio-video work or for the geographic location. For example, the server may transmit the information and an identifier for the audio or video work or location received from the terminal to a database server, with instructions for saving as related records in a database. The recording operation may further include associating the information with a category indicator based on a signal received from a client device, which is interpreted as indicating user selection of a category to which the card should be assigned.

The method 1900 may further include receiving, via the user interface, further information for controlling generation of an interactive card-like data object containing the information for display on a display screen. The information may include, for example, format information, image data including an image of the object, text data describing the object, and a set of user interface controls enabling a user to control disposition of the object.

The server-side method 1900 may include tracking 1930 requests for the information from client devices that identify the portion of the recorded audio work, recorded video work, or recorded audio-video work or the geographic location in connection with the requests. The tracking may include, for example, saving, in a computer memory, user identities each associated with ones of the requests. The method may further include tracking additional information requests from the client devices that indicate a user interest in at least one of purchasing the object or obtaining further information about the object. The method may further include comprising tracking distribution of information based on one or more category indicators designated by end consumers of the information, or tracking distribution of information based on one or more social groups designated by end consumers of the information. The method may include crediting user accounts, for example with reward points, based on at least one of a number or a frequency that of the requests per user. The method may include determining an advertising value for distribution of the information based on a quantity of at least one of the requests or the additional information requests within a define time period.

Figure 20:
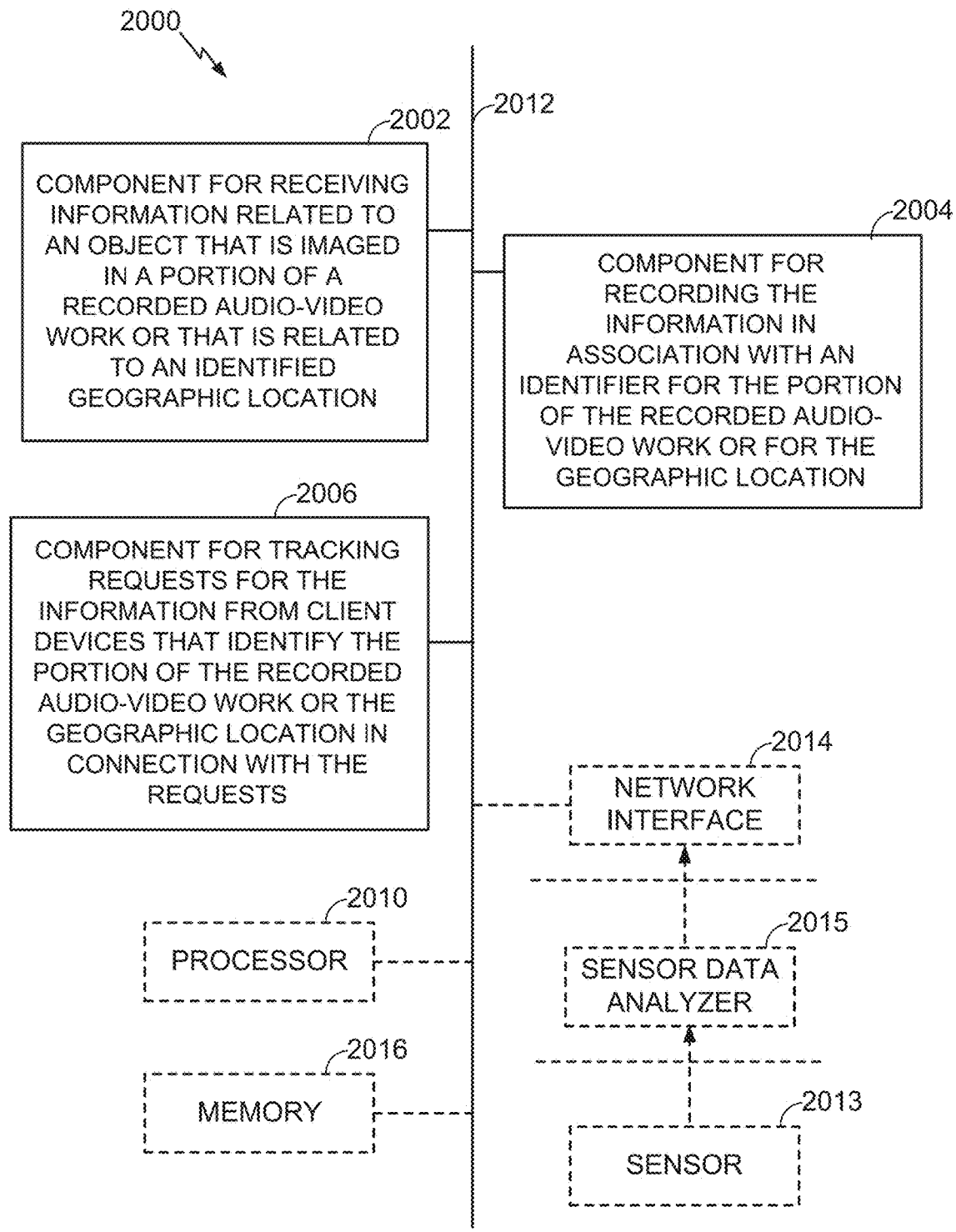
FIG. 20 is a block diagram illustrating aspects of a server-side apparatus for performing a method as shown in FIG. 19.

FIG. 20 is a block diagram illustrating aspects of a server-side apparatus for performing a method as shown in FIG. 19, or variations there on. The apparatus 2000 may comprise an electrical component or module 2002 for receiving information related to an object that is imaged or referred to in a portion of a recorded audio work, recorded video work, or recorded audio-video work or that is related to an identified geographic location. The apparatus 2000 may comprise an electrical component or module 2004 for recording the information in association with an identifier for the portion of the recorded audio work, recorded video work, or recorded audio-video work or for the geographic location. The apparatus 2000 may comprise an electrical component or module 2006 for tracking requests for the information from client devices that identify the portion of the recorded audio work, recorded video work, or recorded audio-video work or the geographic location in connection with the requests.

With reference to FIG. 20, the apparatus 2000 may optionally include a processor module 2020 having at least one processor, in the case of the apparatus 2000 configured as server core. The processor 2020, in such case, may be in operative communication with the modules 2002-2006 via a bus 2012 or similar communication coupling. The processor 2020 may effect initiation and scheduling of the processes or functions performed by electrical components 2002-2006.

In related aspects, the apparatus 2000 may include a network interface 2014, in communication with a sensor data analysis process 2015 that may be operating on the processor 2010 or in a separate server. The process 2015 may receive raw or processed sensor data from at least one sensor 2013, for example a microphone. In further related aspects, the apparatus 2000 may optionally include a module for storing information, such as, for example, a memory device/module 2016. The computer readable medium or the memory module 2016 may be operatively coupled to the other components of the apparatus 2000 via the bus 2012 or the like. The memory module 2016 may be adapted to store computer readable instructions and data for effecting the processes and behavior of the modules 2002-2006, and subcomponents thereof, or the processor 2020, or the method 1900 or similar server-side methods disclosed herein. The memory module 2016 may retain instructions for executing functions associated with the modules 2002-2006. While shown as being external to the memory 2016, it is to be understood that the modules 2002-2006 can exist within the memory 2016.

Figure 21:
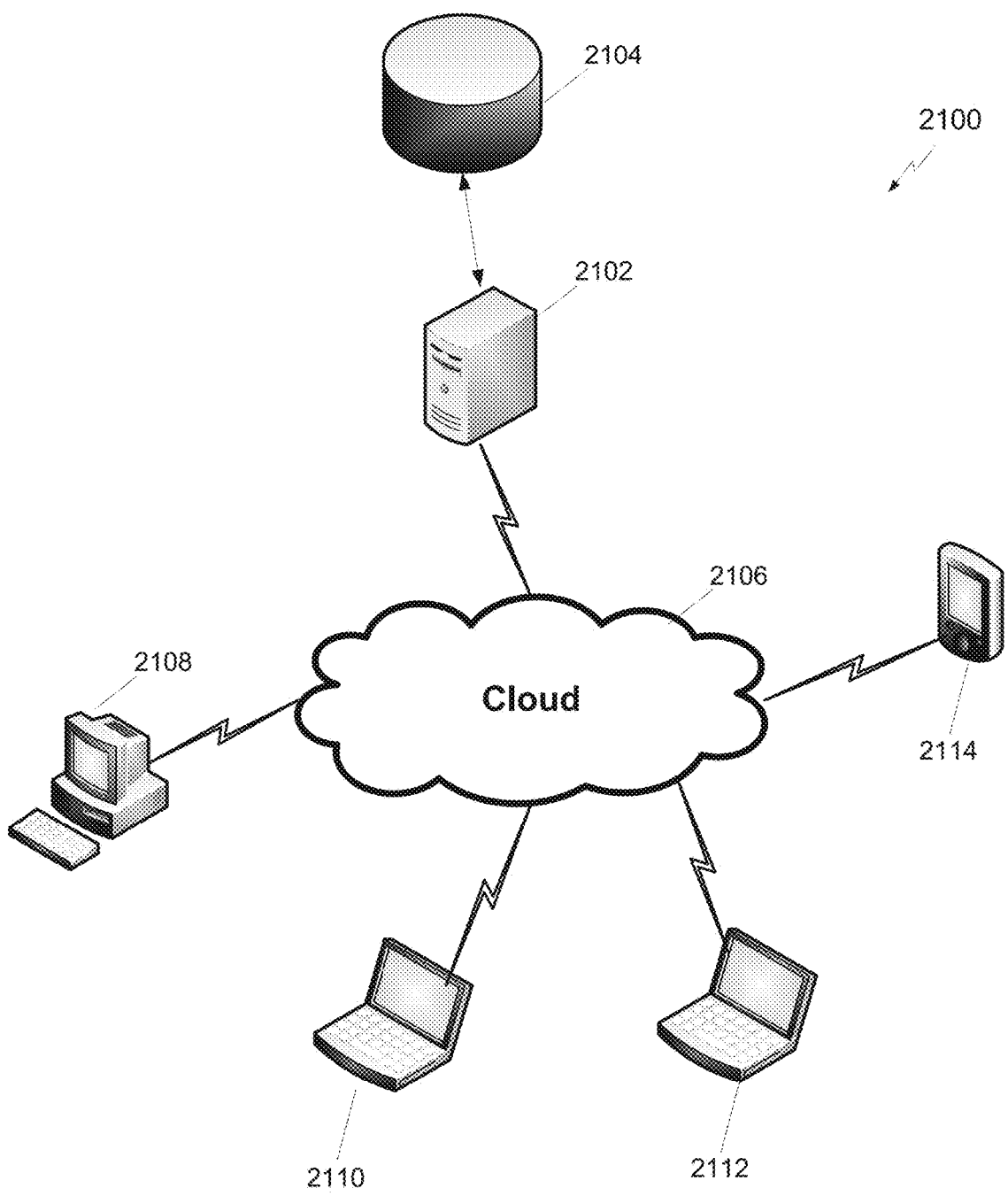
FIG. 21 is a system diagram illustrating components of a system for creation of a relatively large volume of information-to-video content matches.

With reference now to FIG. 21, a system 2100 for matching cards to limited portions of video content is shown. The system 2100 includes an application server 2102, which may include one or more of a content management server, an advertisement management server, or another server. The server 2102 may be connected to one or more user devices (or client devices) 2108, 2110, 2112, 2114 via the cloud 2106 and a card database 2104.

The card database 2104 may include a plurality of cards that each corresponds to a particular subject. The card database 2104 may also include the subject of each of the cards. For example, the subject may be a particular product, an item of interest, a theme, a song, an artist or the like. As described above, the card can include one or more of a variety of information. For example, the card can include a title that is associated with the subject. For example, the card can include a title of "Armani™ Suit" when the subject is an Armani™ suit. Similarly, the card can include an image of the subject, such as an image of the suit. The card can also include interactive features associated with the video content. For example, the interactive features may include additional video, such as comments by a producer or director discussing the subject, his selection of the subject, the meaning of the subject in the video, or the like. The card may also include manufacturer information, a cost of a product, one or more links to webpages where the product can be purchased, or the like.

The card database 2104 may also include list of tags. The tags may each correspond to a video or a limited portion of the video (e.g., a clip or video segment defined as a continuous subset of video frames) as well as a card, and the correspondences may be stored in the card database 2104. The tags may be included in metadata of videos and may include an identifier and/or a link to one or more card. In that regard, a card may be associated with a plurality of video content by creating a tag in each corresponding portion of video content. Tag may be created automatically by audio analysis, or by visual analysis of a video frame or sequence of frames, using a signal analysis system. For example, audio and/or video fingerprinting as described herein above may be used to recognize an audio or video title and/or portion of the audio or video title, and then another application may select an appropriate tag based on a relational database of tags keyed to the title or portion thereof. Tags that are created by automatic analysis may be confirmed by a human operator, if desired.

The video content may include a plurality of video content—for example, any data that is displayed may be considered video content. For example, a movie or video clip may be video content. Similarly, virtual reality data may be video content. Non-linear imaging data wherein video content is rendered on the fly and therefore is not limited to a linear flow, such as for example video games, may be considered video content as well.

When a card is associated with the limited portion of the video, the card or a link to the card may appear on a user device 2108, 2110, 2112, 2114 as the limited portion of the video is being displayed by an output of the user device 2108, 2110, 2112, 2114. In some embodiments, the card should become associated with the limited portion of the video after validation that the subject of the card corresponds to the limited portion of the video. For example, a subject of a card may include a suit. An actor wearing the suit may appear in a limited portion of a video. Based on the association of the suit and the limited portion of the video, the card can be associated with the limited portion of the video such that the card is available when the limited portion of the video is being displayed.

In that regard, when a card is displayed along with a video, the retailer of the subject may make a micropayment for the advertisement. The micropayment may be distributed among the video producer, a product placement agency, and/or the company operating the application server 2102 and/or card database. In that regard, it is in the best interest of each entity to associate as many cards with portions of video content because the retailer will receive additional product views and the video producer, product placement agency and the company operating the application server 2102 will receive more micropayments.

However, it is undesirable for a card to be associated with an unrelated portion of video content as the entire video content may appear unprofessional and the product placement agencies and retailers may lose interest in working with the video producer and/or company operating the application server 2102. Thus, it is preferable for each association of a card to a portion of video content to be validated prior to the association becoming viewable by the general public. This is, however, a daunting task for a single entity to complete due to the relatively large number of videos that are already available and that are generated daily, as well as the large number of products whose manufacturers and retailers would like to have advertised.

Thus, a technical issue to be solved in order for the associations of cards and video content to be relatively profitable for all parties is for the voluminous amount of cards to be matched to the voluminous amount of video content.

Many internet users are interested in performing tasks for rewards, especially if the tasks are relatively uncomplicated. Based on this fact, the inventors have discovered that they can reward internet users for the task of matching the cards to the video content. Thus, operators of one or more of the user devices 2108, 2110, 2112, 2114 may register to review video content and determine whether the cards are actually associated with the video content. A user of a device 2110 may decide he wishes to register to receive rewards for performing matching tasks. The user may, via the user device 2110, transmit registration data to the application server 2102. The registration data may include personal information, such as a name, phone number, email address, or the like. The registration data may also include a requested username and/or password. In response to receiving the registration data from the user device 2110, the application server 2102 may create a user account and associate an identifier of the device 2110, personal information of the user, and/or additional information (such as username/password) with the user account.

For example, a video producer may prepare a card or send a card to the application server 2102 to be prepared. Optionally, the video producer may then indicate that his card is associated with a portion of video content and provide an identifier of the video content. Instead of the operator of the application server 2102 verifying each received association as they are received, the application server 2102 may associate a tag with the portion of the video content. The tag may also be associated with the card. The application server 2102 may then provide a list of all video content and/or tags associated with the video content for registered users to review. In some embodiments, the tag may include a general time, a frame, a scene or the like at which the subject of the card appears.

A registered user may then receive the list of video content and tags and review one or more of the videos via a user device 2110. As the registered user views the video content via the device 2110, the registered user may provide an indication as to whether the card actually corresponds to the video content. The registered user may have one or more votes to apply as to whether each correspondence of cards to videos is correct or incorrect. The user device 2110 may transmit the vote to the application server 2102. In some embodiments, the user device 2110 may also or instead transmit data (such as metadata) to the application server 2102 with a vote. The metadata may include, for example, an identifier of the user device 2110, a time and/or data at which the device received the user input associated with the vote, or the like.

If the application server 2102 receives enough votes indicating that the card corresponds to the video content (and/or receives a certain number or percentage of yes votes to no votes), the application server 2102 may indicate that the association is validated. For example, the application server 2102 may store the association in the database 2104 as being verified and make the association such that all viewers of the video content can view the card. In some embodiments, verified associations may be reviewed by authorized parties, such as employees, prior to the association being viewable by the public. In some embodiments, after a first predetermined number of votes has been received, the association may be verified and after a second predetermined number of votes has been received (or an authorized party reviews and approves the verified association), the association may be made public.

In order to become compensated, the registered users may receive a credit. The credit can be applied to an account of the registered user when a user votes regarding an association, when a user vote becomes verified, when the association is made public, or the like. In some embodiments, the user may receive a first credit when the user votes and additional credits when the user vote becomes verified and/or the association is made public.

The credit may include any type of credit such as points that may be redeemed for cash, merchandise or service, credit towards benefits in a video game and/or credit towards a monetary account such as a credit card.

In some embodiments, a user account may be converted to a trusted user account after a sufficient number of votes become verified, after a ratio of verified to non-verified votes is achieved, and/or after a sufficient number of voted-for associations become public. For example, after 500 votes have become verified and as long as the ratio of verified to non-verified votes is above 85:15, the user account may become verified. A verified account may be given additional votes per video content and/or his votes may carry greater weight. In some embodiments, an association may not be verified and/or made public until a predetermined number of trusted voters have verified the association. Trusted users may also receive a greater amount of credit than non-trusted voters.

In some embodiments, the application server 2102 may provide a list of cards to registered users. In that regard, a user, via the user device 2110, may view video data and determine that a card corresponds to the video even though the video may not have an associated tag. The user may then, via the user device 2110, indicate that a tag should be associated with the video or a limited portion of the video. The user device 2110 may create and associate the tag with the portion of the video and report the tag to the application server 2102, which may then store the tag information in the database 2104. In some embodiments, the user device 2110 may inform the application server 2102 of the association such that the application server 2102 creates the tag. The application server 2102 may then inform other users of the tag such that other users can view the video and vote regarding the applicability of the card to the portion of the video content. In some embodiments, all user accounts can create/request a tag to be associated with video and in some embodiments, only trusted users may do so. In some embodiments, a video producer and/or product placement agency may or may not create and/or request tags. In some embodiments, the tag can only be created by an authorized user, such as an employee.

With reference now to FIG. 22, a portion of video content 2202 and a card 2204 are shown. A device (such as the device 2110 of FIG. 21) may include software and/or a software plugin to allow voting and/or addition of a tag to the video content 2202. For example, as a video is shown and a time of the video associated with a tag is being output, the software and/or plugin may display a button 2203 or other interface object through which the device can add a tag and/or vote on an association.

As shown in FIG. 22, an actor 2206 may be wearing an Armani™ suit 2208. As the illustrated scene 2202 is displayed, the software and/or plugin may display the card 2204 and/or data within the card (such as a title) so that the user can determine whether an association exists between the card and the video content. Because the card 2204 is associated with the Armani™ suit 2208, the user may click the button 2203 to cast a vote indicating that the card 2204 is associated with the video content 2202.

Figure 23:
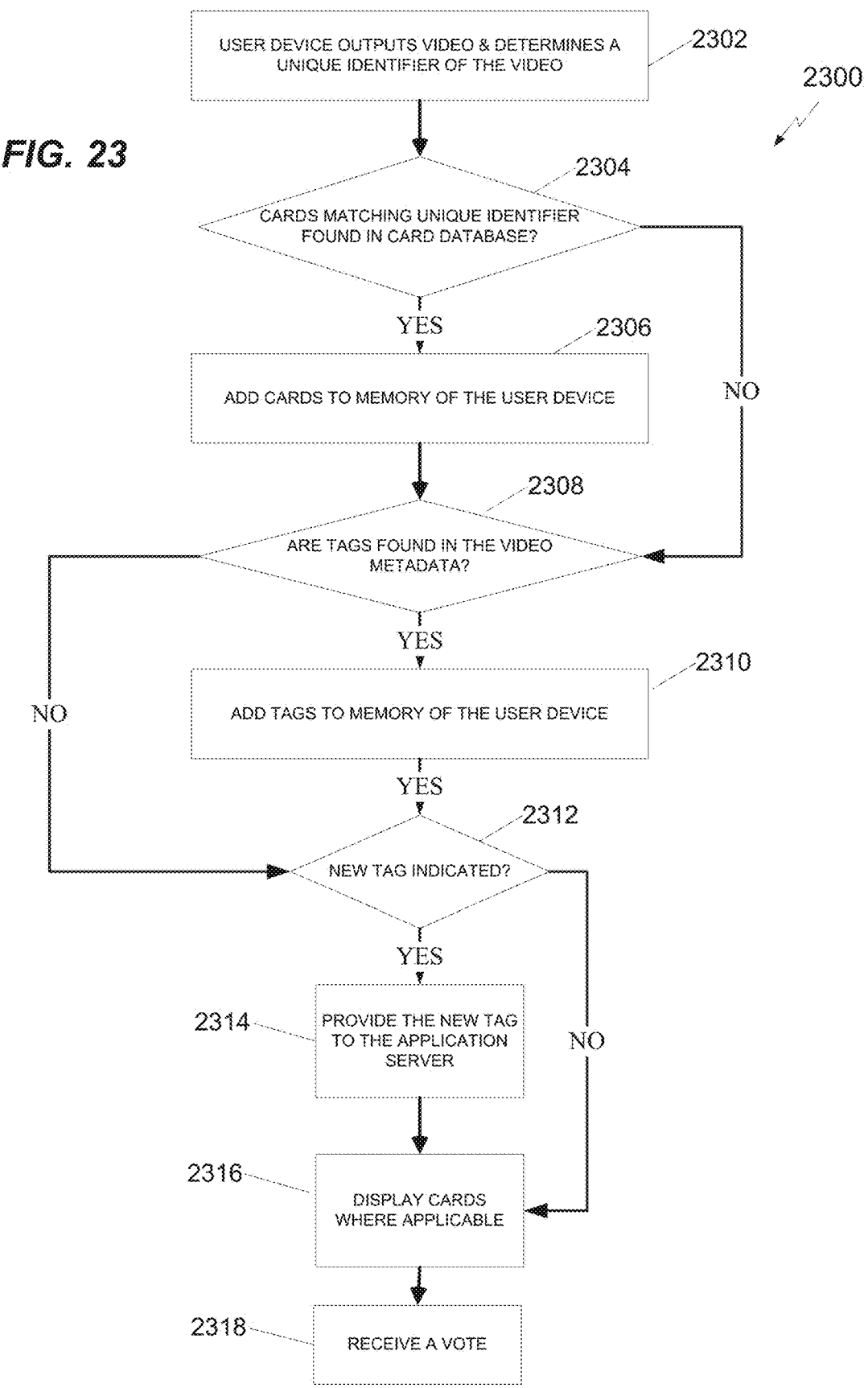
FIG. 23 is a flowchart illustrating a method for creation of a relatively large volume of information-to-video content matches to be used in a system such as the system of FIG. 21.

Referring now to FIG. 23, a method 2300 for matching information to video content for creation of a relatively large volume of information-to-video content matches is shown. An application server may provide a list of video content and/or cards to a user device (not shown). At 2302, a user device may output video from the list of video content and determine a unique identifier of the video, such as an identification number.

At 2304, the user device may receive input indicating whether a card associated with the video content is found. If so, the card(s) may be stored in a memory of the user device at 2306. The card may be used to advertise the subject of the card as the portion of the video corresponding to the card is shown. The card may also or instead be shown to a registered user to be used to determine whether the card corresponds to the video data.

At 2308, the user device may determine whether tags are found in the video metadata. If tags are found in the metadata, they (or a reference/link to the tag) may be added to the memory of the user device at 2310.

At 2312, a user may indicate a new tag using an interface of the user device. For example, if the user determines that a card corresponds to a portion of the video content, and a tag does not exist for the correspondence, the user may indicate a new tag should be created. If a new tag is indicated, the new tag and/or information to be included in the tag is provided to the application server. The application server may then register the tag in a card database and/or create a tag to be associated with the video content.

At 2316, the user device may display the cards and/or links to the cards where applicable. The user device may also or instead display tag information where applicable. At 2318, the user device may receive a vote from the user device indicating whether or not the card corresponds to the portion of the video content.

Figure 24:
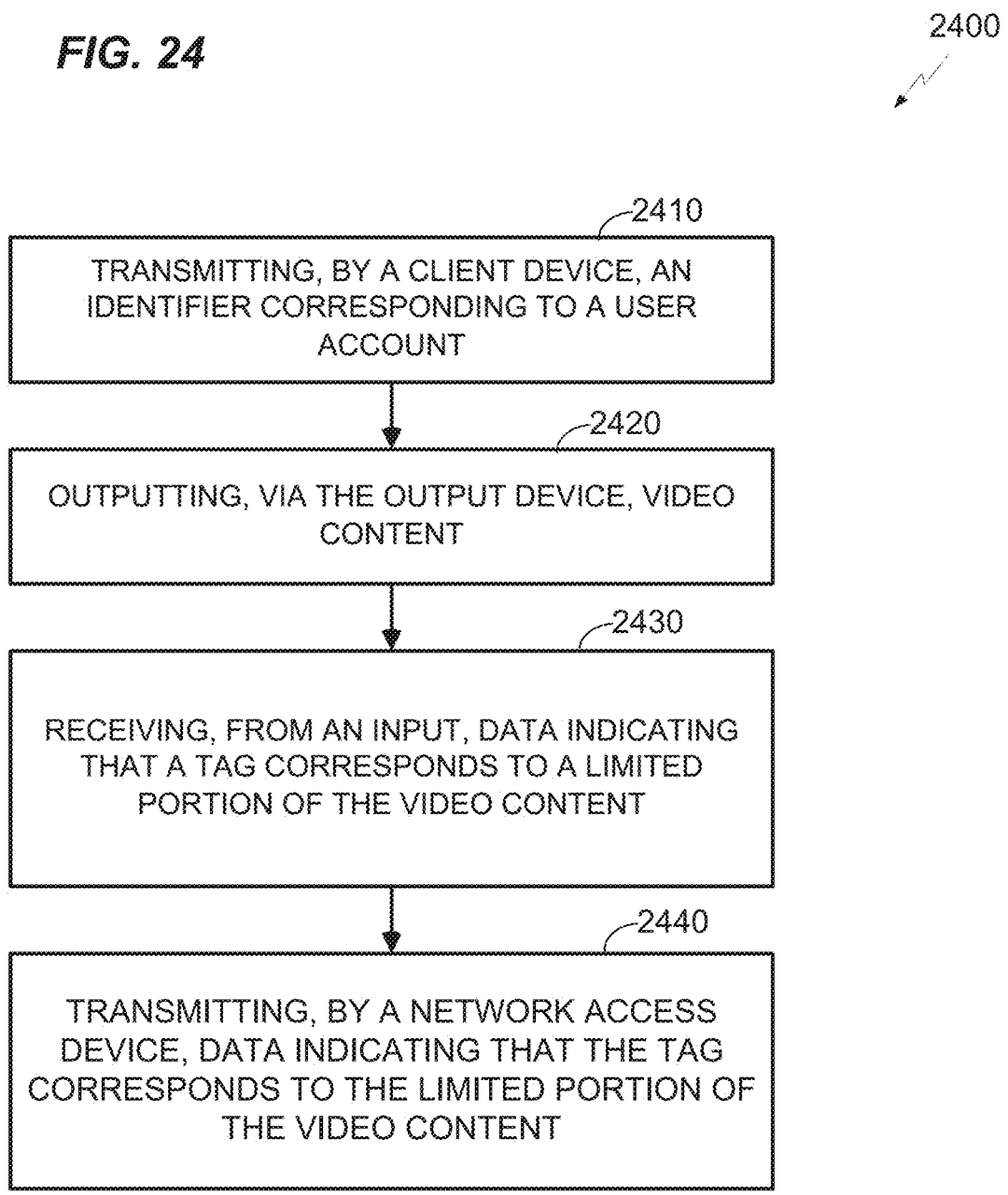
FIGS. 24-26 are flow charts illustrating methods for creation of a relatively large volume of information-to-video content matches to be used in a system such as the system of FIG. 21 by user devices and an application server.

With reference now to FIG. 24, a method 2400 for transmitting data indicating whether a card is semantically associated with a portion of video content, by a client device, is illustrated. At 2410, the method may include transmitting, by a network access device and to an application server, identification information corresponding to a user account. For example, a client device may transmit an identifier of a corresponding user account to an application server. The identifier may include a username, password, name, identifier of the client device, or the like. The server may compare the identifier and determine a user account belonging to the user.

At 2420, the method 2400 may include outputting, via an output device, a video including the video content that includes a tag identifying a limited portion of video content. For example, the client device may output video content via a display or other output device (such as a projector or 3D simulator). The video content may or may not include tags associating a card with a portion of the video content.

At 2430, the method 2400 may include receiving, from a user and via an input device, data indicating that the tag corresponds to a GUI object that includes information topically relevant to a subject of the video content. For example, the client device may receive data indicating that a tag corresponds to a portion of the video content. For example, the data may include data that a new association is made and, thus, a new tag should be created. As another example, the data may include data indicating that a pre-existing tag associating a card with the portion of the video content is accurate. For example, if the card is associated with the portion of the video content, the user may vote that the tag is accurate. If the card is unassociated with the portion of video content, the user may either refrain from voting or, in some embodiments, may be able to vote "no."

At 2440, the method 2400 may include transmitting, by the network access device and to an application server, the data indicating that the tag corresponds to the GUI enabled data object. For example, the client device may transmit the vote to an application server. The vote may indicate whether or not the card, and thus the tag, corresponds to the limited portion of the video content. For example, a mobile or other processor of the client device may receive the user input and convert the input to vote data to be transmitted to the application server via a network access device of the client device.

In further aspects the method 2400 may include transmitting, by the network access device and to the application server, metadata including an identifier of client device and a time at which the data indicating that the tag corresponds to the GUI enabled data object was received. The method 2400 may further include receiving, from the application server and via the network access device, data indicating that the application server has validated that the tag corresponds to the GUI enabled data object.

The method 2400 may further include receiving, from the application server and via the network access device, data indicating that the user account is now a trusted account, based on at least one of: (a) a number of times that data indicating that tags correspond to GUI enabled data objects was transmitted, (b) a total number of messages received from the application server indicating that the application server has validated the correspondence of tags and GUI enabled data objects or (c) a ratio of the number of times that data indicating that tags correspond to GUI enabled data objects was transmitted to the total number of messages received from the application server indicating that the application server has validated the correspondence of tags and GUI enabled data objects.

The method 2400 may further include receiving, via the network access device and from the application server, data indicating that a credit has been applied to the user account. In an aspect, the credit may be greater than a similar credit applied to a non-trusted account.

The method 2400 may further include transmitting, to the application server via the network access device, registration data, and receiving, from the application server and via the network access device, data indicating that the user account was established in response to transmitting the registration data.

In an aspect of the method 2400, the GUI enabled data object may include at least one of a title identifying the subject of the video content, an image related to the subject of the video content or interactive features associated with the subject of the video content.

The method 2400 may further include outputting, by the output device, a new video that does not include a tag. The method 2400 may further include receiving, via the input device and from the user, data indicating that a new tag should be associated with a new limited portion of the new video. The method 2400 may further include transmitting, to the application server and via the network access device, the data indicating that the new tag should be associated with the new limited portion of the new video.

Figure 25:
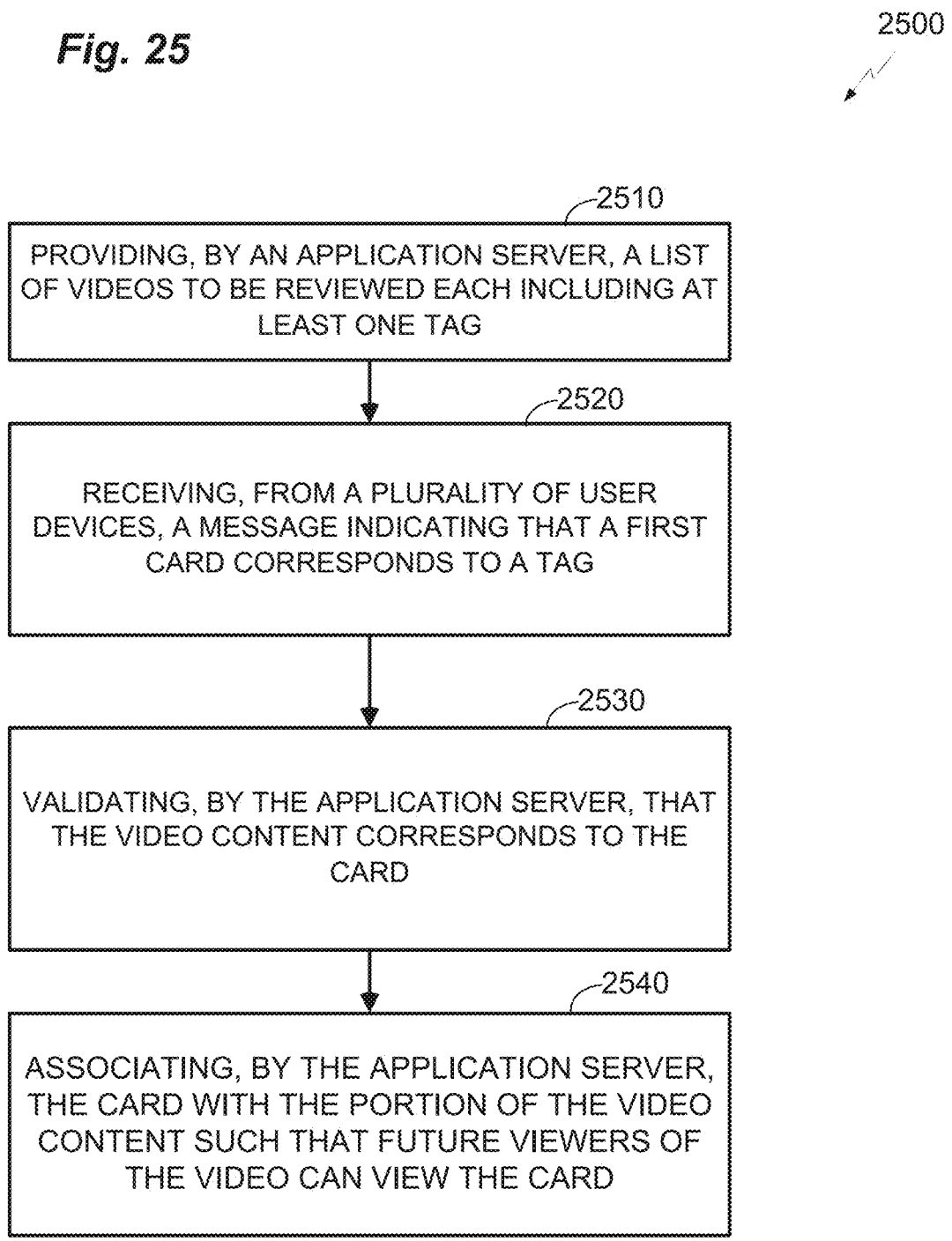

With reference now to FIG. 25, a method 2500 for matching information to video content for creation of a relatively large volume of information-to-video content matches, with tags included in the video content and by an application server, is shown. At 2510, the application server may provide a list of videos to be viewed by users. Each of the videos may include at least one tag associated with at least a portion of the video. The tag may include an association between a card and the portion of the video. For example, a subject of the card may be discussed, heard and/or shown on the video content. For example, the process portion 2510 may include providing, by an application processor and via a network access device, a list of videos to be reviewed for tagging with a tag that identifies a limited portion of the video content of a corresponding video listed in the list of videos.

At 2520, the application server may receive a message indicating that a card corresponds to a tag. For example, if a tag identifying a portion of video content that shows a subject is associated with a card that regards the subject, the client device may transmit a confirmation message, or vote, that is received by the application server. The application server may also receive a number of votes each from a corresponding client device. For example, the process portion 2520 may include receiving, from each of a plurality of devices (e.g., client devices) each associated with a corresponding user account and via the network access device, a message including at least one vote indicating that the tag corresponds to a Graphical User Interface (GUI) object that includes information topically relevant to a subject of video content of one video of the list of videos.

After a sufficient number of votes is received by the application server, the application server may validate that the video content corresponds to the card at 2530. For example, the votes may come from a one or more non-trusted accounts and/or one or more trusted accounts. As disclosed above, votes from trusted accounts may be given more weight. For example, 20 votes may be required to validate that the card matches the video content. This may require 20 votes from non-trusted accounts, 10 votes from trusted accounts, 5 votes from trusted accounts and 10 votes from non-trusted accounts, or the like. For example, the process portion 2530 may include validating, by the application processor, that the tag corresponds to the GUI enabled data object based at least in part on a number of received votes compared to a threshold number of votes.

At 2540, the application server may associate the card with the portion of the video content. When the card is associated with the portion of the video content, the card or a link to the card may be presented to a device not associated with a user account when the relevant portion of the video content is output.

In an aspect of the methods 2300, 2400 or 2500, the video content includes at least one of virtual reality content, video content or video game content. The method 2500 may include the application processor receiving, from each of the plurality of devices and via a network access device, metadata including an identifier of the corresponding device and a time at which the corresponding device received input data indicating that the tag corresponds to the GUI enabled data object and data. The method 2500 may include determining, by the application processor, that a first user account associated with a first device of the plurality of devices is a trusted account based on at least one of: a total number of messages received from devices associated with the first user account; a total number of messages received from the devices associated with the first user account that correspond to video content that was validated by the application processor; or a ratio of the total number of messages received from the devices associated with the user account to the total number of messages received from the devices associated with the first user account that correspond to video content that was validated by the application processor.

In an aspect of the method 2500, a second user account associated with a second device of the plurality of devices is a non-trusted account and the receiving at least one vote includes receiving a greater number of votes from the first device than the second device due to the first account being a trusted account. In such case, the method 2500 may include associating, by the application processor, a credit to each of the plurality of devices in response to receiving the at least one vote. The credit may include, for example, at least one of a monetary credit, credit that can be redeemed for products or benefits, a credit to a monetary account or a credit to a game account. The credit applied to the first account may be greater than the credit applied to the second account, due to the first account being a trusted account.

The method 2500 may further include assigning, by the application processor, the video content to an authorized account in response to the number of received votes reaching or exceeding the threshold number of votes, and receiving, from a device associated with the authorized account, data indicating that the tag corresponds to the GUI enabled data object. In the foregoing, validating that the tag corresponds to the GUI enabled data object may be further determined based on receiving the data indicating that the tag corresponds to the GUI enabled data object from the device associated with the authorized account.

The method 2500 may further include receiving, by the application processor and via the network access device, registration data from a new device not associated with a user account, and creating, by the application processor, a new user account associated with the second device.

The method 2500 may further include adding, by the application processor and to the one video, metadata indicating that the GUI enabled data object is associated with the video content. The application processor may be a mobile application processor. In the foregoing, the metadata may allow the GUI enabled data object to be associated with additional videos including the video content. The method 2500 may further include storing, in a GUI enabled data object database, a plurality of GUI enabled data objects and a list of tags each corresponding to at least one of the plurality of GUI enabled data objects. The GUI enabled data object may include at least one of a title identifying the subject of the video content, an image related to the subject of the video content or interactive features associated with the subject of the video content.

The method 2500 may further include: receiving, from a remote device and via the network access device, a new video not in the list of videos; receiving, from the remote device and via the network access device, data associating the tag with the new video; and adding, by the application processor, the tag to a database having tag data.

Figure 26:
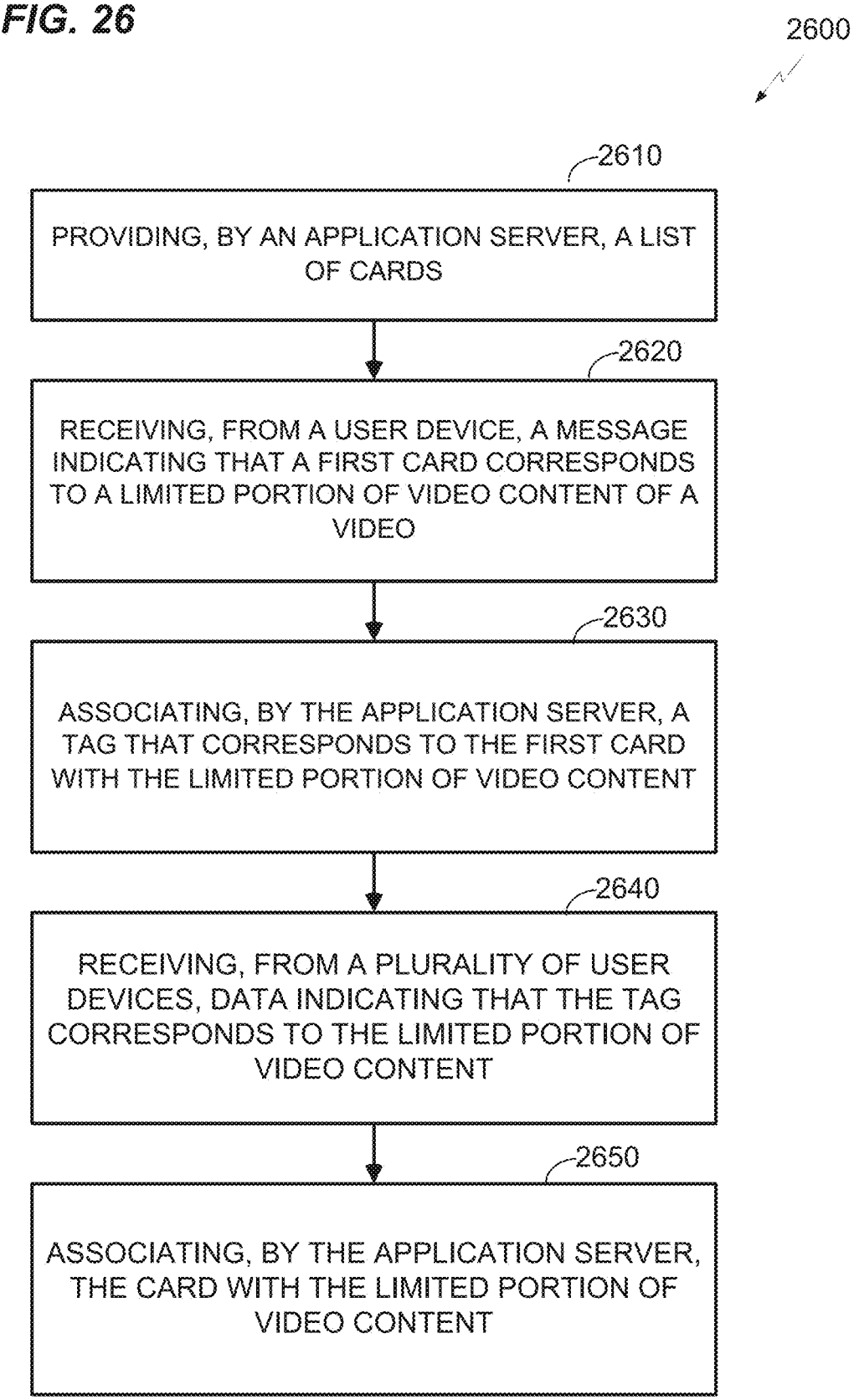

With reference now to FIG. 26, a method 2600 for matching information to video content for creation of a relatively large volume of information-to-video content matches, with tags not included in the video content and by an application server, is shown. The method 2600 may include, at 2610, providing, by an application processor, a plurality of GUI objects each including information topically relevant to a subject of video content of a video. For example, the application server may provide a list of cards to a destination device, such as a client device. The cards, list of cards, topics of the cards, and/or the like may be viewable or receivable by one or more user devices.

The method 2600 may include, at 2620, receiving, from one of a plurality of devices each associated with a corresponding user account and via a network access device, data indicating that a one of the plurality of GUI enabled data objects corresponds to a limited portion of video content of one of a plurality of videos. For example, the application server may receive a message indicating that a first card corresponds to a limited portion of video content from a user device. The user device may be associated with a trusted or non-trusted registered user, a video producer, a product placement agency, or the like. The limited portion of video content may be indicated by an identifier for the entire video content (e.g., file or streaming session) in conjunction with a pair of time values, or with a pair of frame numbers, wherein a first number of the pair denotes the beginning of the limited portion, and the second number denotes the ending of the limited portion. The limited portion may be fairly short, for example, less than a minute, or less than six seconds, of a much longer video content. The card should correspond in the sense of relating semantically to a specific item, dialog, image, person, or other particular content conveyed specifically by the limited portion of the video content.

The method 2600 may include, at 2630, associating, by the application processor, a GUI enabled data object with the limited content of the video content. For example, the application server (or in some embodiments, the user device) may create a tag and associate the tag with the limited portion of the video content. The tag may include the first card, a link to the first card and/or data associated with the first card. The tag may be stored in a card database and accessible by the application server. In that regard, the application server may provide the new tag when presenting a list of tags to registered users.

After the tag is provided to additional registered users, the registered users may review the video content and determine whether the card is actually associated with the video content. By interacting with an application interface, any one or more of these additional users may cause their user device to transmit a signal to the application server indicating whether or not the tag (and associated card) corresponds to the portion of the video content. The method 2600 may include, at 2640, the application server receiving data from these additional user devices indicating whether or not the tag (and associated card) corresponds to the portion of the video content, in confirmation or contradiction of the initial correspondence indicated. Accordingly, the method 2600 may include providing, the tag to at least another device of the plurality of devices, and receiving, from the at least another device and via a network access device, data indicating that the GUI enabled data object corresponds to the limited portion of the video content of the video. The method 2600 may include validating, by the application processor, that the GUI enabled data object corresponds to the limited portion of the video content based at least in part on the number of devices included in the at least another device.

If sufficient votes indicating that the tag does correspond to the video content are received, the application server may validate the association (with or without review of an authorized user, such as an employee). The method 2600 may include, at 2650, associating a tag with the GUI enabled data object, the tag identifying the limited content and the GUI enabled data object. For example, after validation (and potentially review), the application server may associate the card with the limited portion of the video content. The association may be stored in the card database. In that regard, when user devices not associated with an account view the video data, the card and/or a link to the card may be shown via displays of the user devices.

Figure 27:
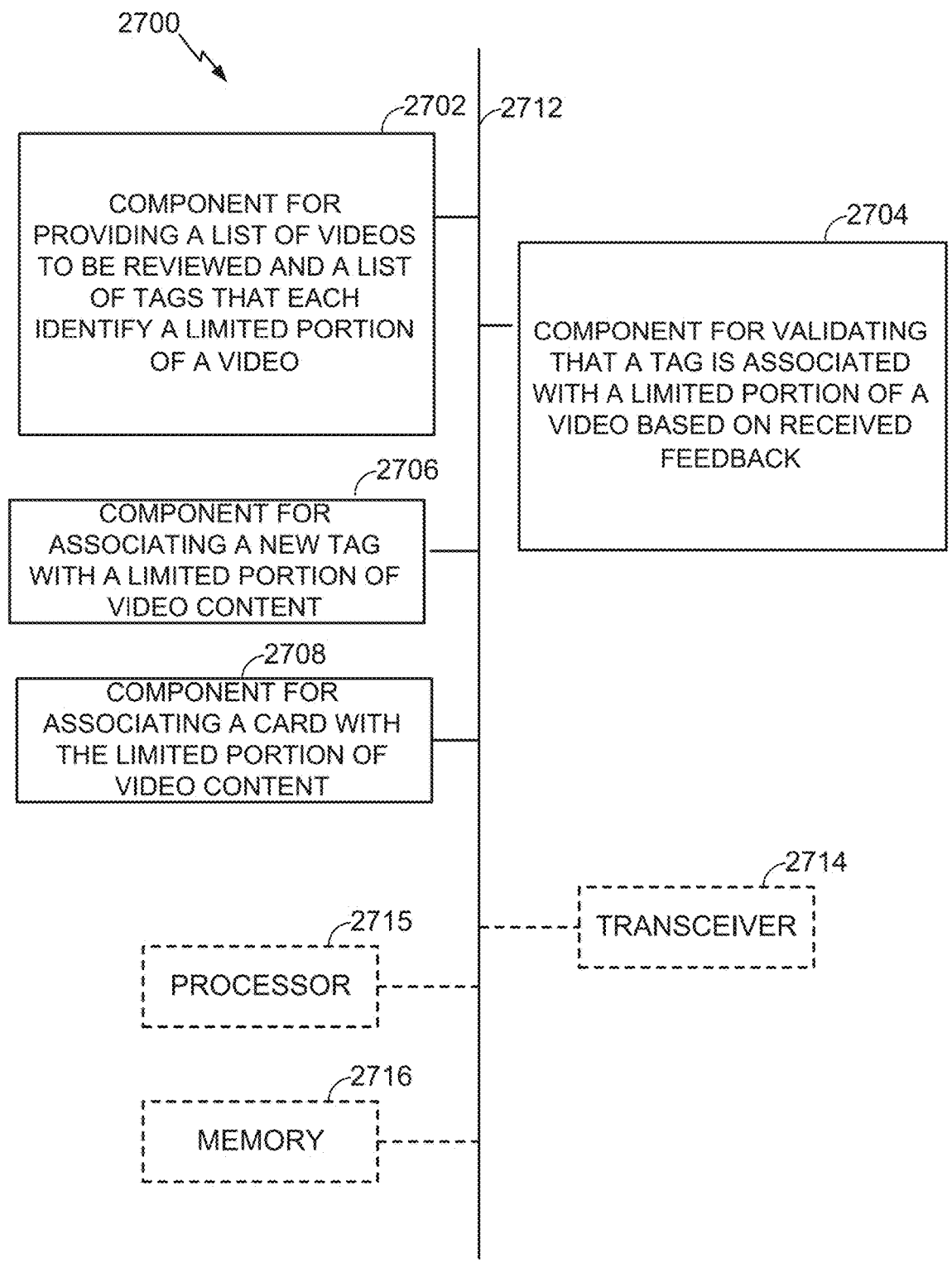
FIG. 27 is a block diagram illustrating aspects of a server-side apparatus for performing methods as shown in any of FIGS. 23-26.

With reference to FIG. 27, there is provided an exemplary apparatus 2700 that may be configured as a client device including at least one display screen, user input device, processor, memory and network interface device, or as a processor or similar device for use within the client device. As depicted, the apparatus 2700 may include functional blocks that can represent functions implemented by a processor, software, or combination thereof (e.g., firmware).

As illustrated in FIG. 27, the apparatus 2700 may comprise an electrical component or the module 2702 for providing a list of videos to be reviewed and/or a list of tags that each identify a limited portion of a video and may be associated with cards. The apparatus 2700 may comprise an electrical component or the module 2704 for validating that a tag is associated with a limited portion of a video based on feedback received from one or more remote devices (such as client/user devices). The apparatus 2700 may comprise an electrical component or the module 2706 for associating a new tag with a limited portion of video content. The new tag may be created by the apparatus 2700 and/or may be received from a remote device. The apparatus 2700 may comprise an electrical component or the module 2708 for associating a card with a limited portion of video content. When the card is associated with the limited portion of the video content, other remote devices not associated with an account can be shown the card for advertisement or other purposes.

With reference to FIG. 27, the apparatus 2700 may optionally include a processor module 2715 having at least one processor. The processor 2715, in such case, may be in operative communication with the modules 2702-2708 via a bus 2712 or similar communication coupling. The processor 2715 may effect initiation and scheduling of the processes or functions performed by electrical components 2702-2708.

In related aspects, the apparatus 2700 may also network interface device 2714. The network interface device 2714 may be wired or wireless, or any combination. For example, the network interface device 2714 may communicate via Wi-Fi, fiber optic cable, CAT 5 cable, and/or any other medium. In further related aspects, the apparatus 2700 may optionally include a module for storing information, such as, for example, a memory device/module 2716. The computer readable medium or the memory module 2716 may be operatively coupled to the other components of the apparatus 2700 via the bus 2712 or the like. The memory module 2716 may be adapted to store computer readable instructions and data for effecting the processes and behavior of the modules 2702-2708, and subcomponents thereof, or the processor 2715, or any of the methods 2300, 2400, 2500, 2600 and similar application server and/or user device methods disclosed herein. The memory module 2716 may retain instructions for executing functions associated with the modules 2702-2708. While shown as being external to the memory 2716, it is to be understood that the modules 2702-2708 can exist within the memory 2716 and/or within the processor 2715 (for example, the processor may be an ASIC or other function-specific processor or controller).

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Other Operational Details of User Interface: The KUBE-iT Wish List Feature. The following features may be implemented as part of the methods described herein above. A consumer using the KUBE-iT mobile app or the KUBE-iT web user interface can save and organize their KUBE-iT™ Cards on their KUBE-iT Wish List by categories. For example, if a consumer is shopping for his or her mom's birthday, they can add KUBE-iT™ cards to a category called "Mom's birthday ideas" as they discover various products throughout the year.

When saving a KUBE-iT™ Card to the KUBE-iT Wish List, a consumer can associate the KUBE-iT™ card to a person or multiple people on their mobile phone contact list The consumer can view their KUBE-iT Wish List categories and the associated KUBE-iT™ cards contained in those categories from any device connected to their KUBE-iT account, including the KUBE-iT app or web browser on their mobile devices, PC, or Macs. The consumer can save new KUBE-iT™ cards to existing categories on their KUBE-iT Wish List, create new Wish List categories for their KUBE-iT™ cards, and move KUBE-iT™ cards from one category to another.

A consumer using KUBE-iT can set reminders on particular KUBE-iT™ cards or KUBE-iT Wish List categories. For example, a consumer has created a KUBE-iT Wish List category called Mom's Birthday Ideas. The consumer could input their mother's birthday on that wish list category and set a reminder to be alerted about the upcoming birthday in advance (Could be pre-set reminders of 1-week, 2-weeks, or a custom inputted time-frame for the reminder). A consumer can earn points and/or participate in games so that there are rewards for the more KUBE-iT™ cards the consumer downloads and saves, the more points and/or rewards they can earn from the advertiser or others Consumers using KUBE-iT can share an individual KUBE-iT™ Card, multiple KUBE-iT™ Cards, and one or more KUBE-iT Wish List categories containing their associated KUBE-iT™ cards with friends and family on their social network. A consumer can choose the recipient(s) that can view their KUBE-iT™ Card(s), or KUBE-iT Wish List categories. For example, a consumer can set up a KUBE-iT Wish List category for "My Birthday Wishes." The consumer can then populate that KUBE-iT Wish List category with KUBE-iT™ Cards for products they see on TV and that they might want for their birthday. The consumer can then share that birthday wish list with his or her parents and siblings so they can view the KUBE-iT™ Cards and buy products that the consumer wants for their birthday. At any time, the consumer can see who has access to view their KUBE-iT Wish List and revoke their access if desired.

A consumer can sort/search their KUBE-iT Wish List and KUBE-iT™ Cards in several ways: Sort KUBE-iT Wish List Categories Alphabetical: A-Z and Z-A; Sort KUBE-iT Wish List Categories by recent activity (display categories that have had cards most recently added); Sort KUBE-iT™ Cards Alphabetical by Product Name: A-Z and Z-A; Sort KUBE-iT™ Cards by time: Newest to Oldest, and Oldest to Newest; Sort/search KUBE-iT Cards by the television show that it was associated: Alphabetically A-Z and Z-A; Sort/search KUBE-iT™ Card by Vendor listed on the card (Shows all cards from a particular vendor); Sort KUBE-iT™ Cards by Category: Shows all KUBE-iT™ cards grouped by their category; should be A-Z and Z-A sortable; Sort KUBE-iT™ Cards by Price; Lowest to Highest and highest to lowest; Sort/search KUBE-iT™ Cards by contact it is tied to (person the card is associated with).

KUBE-iT Geo-Location Enabled Services (Location/time based tagging for card downloads): KUBE-iT can display KUBE-iT™ cards for products or information associated with any location where the user is using the application while watching video. For example, for a user at the Santa Monica Pier, and KUBE-iT serves up information on discounts nearby dining, clothing, hotels, ride tickets, etc. This will utilize geo-location services on the phone to serve up relevant KUBE-iT™ cards. KUBE-iT will use geo-location services to push offers or coupons to a consumer's phone based on the KUBE-iT™ cards that have saved. For example, a consumer has saved a KUBE-iT™ card for a pair of shoes, and when at the mall, they receive a push notification with a $10 discount for those shows at a nearby department store, or the like.

KUBE-iT Online Video Services (e.g. YouTube): Matchmaking service for independent online media (i.e. YouTube and similar services) allows video owners and advertisers to create lists of products/services featured in their videos and when a match is made via a KUBE-iT sync, a KUBE-iT™ Card could be downloaded. There are multiple possibilities to encourage video owners to participate: for example, direct per-click sharing of revenue in a manner similar to Google's Adsense system, or through a commission system whereby a specified number of Card downloads will trigger a payment of a predetermined amount of money. The commissions may be paid by the advertiser at terms mutually agreeable.

KUBE-iT Web-enabled Technology: KUBE-iT embedded web interface may enable the graphical selection of products with a mouse or via touch-screens (i.e. directly clicking/touching the products visible on the screen) when viewing online video content. This could include highlighting or placing an icon during pause screens so as not to interrupt the viewing experience. The cards could be automatically saved the user's KUBE-iT account for later review.

Further Notes Regarding Matchmaker Use Cases and Processes: an implementation of the MatchMaker process, and related use cases, are described. The MatchMaker process is one in which Internet based videos are associated with database records that (1) add extra information to the video and can transmit and make that information available to external processes that will present the information to an end-user in such a way that they can utilize the information to make purchases, statements, and positions on items and ideas within those videos, and (2) have the internet based video UID (some unique identifier) referenced in the database records so that same external process can do as in #1. The external process need not be may include any suitable process for presenting the database reference information (KUBE-iT Cards) and assisting the user in commenting on or purchasing related products and services referred by the information.

In addition to already defined KUBE-iT processes, this disclosure includes methods to reduce the amount of effort it takes to filter through possible matches by enlisting the general public to vote on possible matches. After a certain number of votes of adequate quality are obtained, the video is put onto an approval queue to be reviewed before the information is validated.

Definitions: VP=Video Producer; PP=Product Placement agent/agency; PM=Product Manufactures/owners; Tags/codes=encoded data in the data stream that uniquely identifies information in or about the video or content; Database=KUBE-iT database; ACR=Automatic Content Recognition; XML=eXtensible Markup Language, a standard method used to embed data in a stream of data; Video Viewer=A consumer of the video content and are neither the video producer or a KUBE-iT employee; UID=A unique identifier that is random and will not appear in any other video or product.

Further Explanation of Economic Use Case: Internet videos have unique identifiers that can be accessed by a player. This unique identifier can be used to reference our KUBE-iT database. Small VP want to create revenue by self product placement in their videos. The ability to receive micropayments from their videos may be enough to support their video creation efforts. Small groups of VP make large groups of product visibility. This allows these large groups to gain visibility of PP or PM.

KUBE-iT becomes an aggregator for the small VP relationships to the product reference revenue. One contract and/or facilitating with KUBE-iT rather than thousands of contacting and/or small contracts with individual VPs. KUBE-iT would facilitate and/or sub-contract the overall product reference contracts.

Videos may have tags or codes embedded in the metadata of the datastream. If they do not, KUBE-iT has the ability to create relationship links to tags and codes in the KUBE-iT database. That way whether the video has tags or codes embedded, KUBE-iT can still reference content in the video.

Internet videos may have ACR fingerprint and timestamps added to the KUBE-iT database so videos played on devices that are being "observed" by the KUBE-iT application running on another device can still recognize and reference content in the video.

Video Viewers can add tags to the KUBE-iT database. As a video is being played, the end user can add KUBE-iT Cards via tags and codes if they see products or information that should be referred to other users. These cards could be a product that they see in a video, or related information to improve the information available about a video.

Unapproved reference content (KUBE-iT Cards) that are added by a Video Viewer is content that has been added to the KUBE-iT database, but has not been validated by other users, video producers, or authorized by KUBE-iT. Before this content is "trusted" or authorized, other "Super Users" will have the ability to vote on it's authenticity.

KUBE-iT reference content (KUBE-iT Cards) that has not been approved will not be displayed to the standard user. To a group of users that want to vote—because they get something in return for doing so—the untrusted content is shown in a different color or other method to indicate that it needs to be voted up or down.

Once a threshold of voters has approved an untrusted card, and becomes a verified status and is then added to a queue of approvals to be approved by a KUBE-iT employee. KUBE-iT employees then publish the approved KUBE-iT Card as trusted information for all users to see and consume.

The KUBE-iT database will allow for a reverse search of videos that have certain KUBE-iT cards or classes of KUBE-iT cards. This will allow users to use KUBE-iT to search for videos that feature certain products or product types.

Technical Steps: There are several technical steps that enable the MatchMaker process and can be used in the methods described herein. Video Producer may include XML tags (codes) in the video metadata to match content to database records. Video Producer XML tags may include time based information to help show additional information when the video is presenting that information. ACR technology fingerprints can be added to the video's database record to ensure that future derivations of the video on other media is matched properly to the same cards. End user video viewers may add information tags to the database connected to the video records. Tags may be only shared with other viewers if "approved" by a qualified user, e.g., a "super user."

Access to the tags: Browser/viewer add-ons will access the XML metadata of videos to tie the video to the database. Filtering of external tags: Video viewers can "vote", and gain "points" for validated votes, for video tags. Approval of tags: After a certain number of "votes" have been made, the video is pushed to the top of the list of videos needing review by an authority. Approval voting: successful voters are given higher number of votes to have the video reviewed.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the Figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, non-transitory computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method by an application server for matching information to video content for creation of a relatively large volume of information-to-video content matches, comprising:

providing, by an application processor and via a network access device, a list of videos to be reviewed for tagging with a tag that identifies a limited portion of the video content of a corresponding video listed in the list of videos;

receiving, from each of a plurality of devices each associated with a corresponding user account and via the network access device, a message including at least one vote indicating that the tag corresponds to a Graphical User Interface (GUI) object that includes information topically relevant to a subject of video content of one video of the list of videos;

validating, by the application processor, that the tag corresponds to the GUI enabled data object based at least in part on a number of received votes compared to a threshold number of votes; and assigning, by the application processor, the video content to an authorized account in response to the number of received votes reaching or exceeding the threshold number of votes; and receiving, from a device associated with the authorized account, data indicating that the tag corresponds to the GUI enabled data object;

wherein validating that the tag corresponds to the GUI enabled data object is further determined based on receiving the data indicating that the tag corresponds to the GUI enabled data object from the device associated with the authorized account.

2. The method of claim 1, further comprising receiving, from each of the plurality of devices and via a network access device, metadata including an identifier of a corresponding one of the plurality of devices and a time at which the corresponding one of the plurality of devices received input data indicating that the tag corresponds to the GUI enabled data object and data.

3. The method of claim 1, further comprising determining, by the application processor, that a first user account associated with a first device of the plurality of devices is a trusted account based on at least one of:

a total number of messages received from devices associated with the first user account;

a total number of messages received from the devices associated with the first user account that correspond to video content that was validated by the application processor; or a ratio of the total number of messages received from the devices associated with the user account to the total number of messages received from the devices associated with the first user account that correspond to video content that was validated by the application processor.

4. The method of claim 3, wherein a second user account associated with a second device of the plurality of devices is a non-trusted account and receiving at least one vote includes receiving a greater number of votes from the first device than the second device due to the first account being a trusted account.

5. The method of claim 4, further comprising associating, by the application processor, a credit to each of the plurality of devices in response to receiving the at least one vote.

6. The method of claim 5, wherein the credit includes at least one of a monetary credit, credit that can be redeemed for products or benefits, a credit to a monetary account or a credit to a game account.

7. The method of claim 1, further comprising adding, by the application processor and to the one video, metadata indicating that the GUI enabled data object is associated with the video content.

8. The method of claim 7, wherein the metadata allows the GUI enabled data object to be associated with additional videos including the video content.

9. The method of claim 1, further comprising storing, in a GUI enabled data object database, a plurality of GUI enabled data objects and a list of tags each corresponding to at least one of the plurality of GUI enabled data objects.

10. The method of claim 1, wherein the GUI enabled data object includes at least one of a title identifying the subject of the video content, an image related to the subject of the video content or interactive features associated with the subject of the video content.

11. A method by an application server for matching information to video content for creation of a relatively large volume of information-to-video content matches, comprising:
   providing, by an application processor and via a network access device, a list of videos to be reviewed for tagging with a tag that identifies a limited portion of the video content of a corresponding video listed in the list of videos;
   receiving, from each of a plurality of devices each associated with a corresponding user account and via the network access device, a message including at least one vote indicating that the tag corresponds to a Graphical User Interface (GUI) object that includes information topically relevant to a subject of video content of one video of the list of videos;
   validating, by the application processor, that the tag corresponds to the GUI enabled data object based at least in part on a number of received votes compared to a threshold number of votes; and
   determining, by the application processor, that a first user account associated with a first device of the plurality of devices is a trusted account based on at least one of:
      a total number of messages received from devices associated with the first user account;
      a total number of messages received from the devices associated with the first user account that correspond to video content that was validated by the application processor; or
      a ratio of the total number of messages received from the devices associated with the user account to the total number of messages received from the devices associated with the first user account that correspond to video content that was validated by the application processor;
   wherein a second user account associated with a second device of the plurality of devices is a non-trusted account and receiving at least one vote includes receiving a greater number of votes from the first device than the second device due to the first account being a trusted account.

12. The method of claim 11, further comprising receiving, from each of the plurality of devices and via a network access device, metadata including an identifier of a corresponding one of the plurality of devices and a time at which the corresponding one of the plurality of devices received input data indicating that the tag corresponds to the GUI enabled data object and data.

13. The method of claim 11, further comprising associating, by the application processor, a credit to each of the plurality of devices in response to receiving the at least one vote.

14. The method of claim 13, wherein the credit includes at least one of a monetary credit, credit that can be redeemed for products or benefits, a credit to a monetary account or a credit to a game account.

15. The method of claim 11, further comprising:
   assigning, by the application processor, the video content to an authorized account in response to the number of received votes reaching or exceeding the threshold number of votes; and
   receiving, from a device associated with the authorized account, data indicating that the tag corresponds to the GUI enabled data object;
   wherein validating that the tag corresponds to the GUI enabled data object is further determined based on receiving the data indicating that the tag corresponds to the GUI enabled data object from the device associated with the authorized account.

16. The method of claim 11, further comprising adding, by the application processor and to the one video, metadata indicating that the GUI enabled data object is associated with the video content.

17. The method of claim 16, wherein the metadata allows the GUI enabled data object to be associated with additional videos including the video content.

18. The method of claim 11, further comprising storing, in a GUI enabled data object database, a plurality of GUI enabled data objects and a list of tags each corresponding to at least one of the plurality of GUI enabled data objects.

19. The method of claim 11, wherein the GUI enabled data object includes at least one of a title identifying the subject of the video content, an image related to the subject of the video content or interactive features associated with the subject of the video content.

* * * * *